(12) United States Patent
Yamagishi et al.

(10) Patent No.: US 9,823,883 B2
(45) Date of Patent: Nov. 21, 2017

(54) PRINTING MANAGEMENT DEVICE AND METHOD, PRINTING MANAGEMENT SYSTEM, PRINTING SYSTEM INFORMATION PROCESSING DEVICE AND RECORDING MEDIUM FOR DECIDING A PRINTOUT CONDITION

(71) Applicant: FUJIFILM Corporation, Minato-ku, Tokyo (JP)

(72) Inventors: Hideki Yamagishi, Tokyo (JP); Takahiro Okamoto, Tokyo (JP); Hideyasu Ishibashi, Tokyo (JP); Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/066,066

(22) Filed: Mar. 10, 2016

(65) Prior Publication Data

US 2016/0188268 A1    Jun. 30, 2016

Related U.S. Application Data

(63) Continuation of application No. 14/554,669, filed on Nov. 26, 2014, now Pat. No. 9,317,227, which is a
(Continued)

(30) Foreign Application Priority Data

May 28, 2012   (JP) ................................. 2012-121173

(51) Int. Cl.
*G06F 3/12* (2006.01)
*G06Q 10/06* (2012.01)
*H04N 1/60* (2006.01)

(52) U.S. Cl.
CPC .......... *G06F 3/1208* (2013.01); *G06F 3/1204* (2013.01); *G06F 3/126* (2013.01);
(Continued)

(58) Field of Classification Search
CPC ....................................................... G06F 3/1208
USPC ....................................... 358/1.15, 1.13, 1.14
See application file for complete search history.

(56) References Cited

U.S. PATENT DOCUMENTS

| 5,850,584 | A | 12/1998 | Robinson et al. | |
|---|---|---|---|---|
| 2003/0128882 | A1* | 7/2003 | Kim .................... | G06T 9/005 |
| | | | | 382/239 |
| 2007/0052992 | A1* | 3/2007 | Yamada ................ | G06F 3/1205 |
| | | | | 358/1.13 |

FOREIGN PATENT DOCUMENTS

| JP | 2001134399 A | * | 5/2001 |
|---|---|---|---|
| JP | 2005275724 A | * | 10/2005 |

(Continued)

OTHER PUBLICATIONS

International Preliminary Report on Patentability and Written Opinion, dated Dec. 11, 2014, issued in corresponding International Application No. PCT/JP2013/063762, 13 pages in English and Japanese.

(Continued)

*Primary Examiner* — Jacky X Zheng
(74) *Attorney, Agent, or Firm* — Sughrue Mion, PLLC

(57) ABSTRACT

A printing management device includes: a customer property DB configured to accumulate history data for each customer; a printer property DB configured to record printer property data for each of multiple printers; target image quality index decision means configured to decide a target image quality index by the use of the history data of the customer property DB; and printout condition decision means configured to decide/output output conditions with reference to the printer property DB according to order information and the target image quality index.

24 Claims, 23 Drawing Sheets

Related U.S. Application Data continuation of application No. PCT/JP2013/063762, filed on May 17, 2013.

(52) U.S. Cl.
CPC .......... *G06F 3/1226* (2013.01); *G06F 3/1254* (2013.01); *G06F 3/1273* (2013.01); *G06F 3/1285* (2013.01); *G06Q 10/06395* (2013.01); *H04N 1/6036* (2013.01); *H04N 1/6047* (2013.01)

(56) References Cited

FOREIGN PATENT DOCUMENTS

| | | | |
|---|---|---|---|
| JP | 200688547 | A | 4/2006 |
| JP | 2006088547 | A * | 4/2006 |
| JP | 4037011 | B2 | 1/2008 |
| JP | 4298050 | B2 | 7/2009 |
| JP | 2009289237 | A | 12/2009 |

OTHER PUBLICATIONS

Notification of Reasons for Rejection, dated Sep. 29, 2015, issued in corresponding JP Application No. 2012-121173, 6 pages in English and Japanese.

Communication, dated Jan. 28, 2016, issued in corresponding EP Application No. 13796541.4, 11 pages in English.

International Search Report of PCT/JP2013/063762, dated Aug. 6, 2013. [PCT/ISA/210], 5 pages in English and Japanese.

\* cited by examiner

FIG.4

| USAGE | CUSTOMER NAME | JOB ID | RECEPTION DATE | COSTS C | DELIVERY DATE D | CONTENT TYPE | OVERALL IMAGE QUALITY | IMAGE QUALITY ATTRIBUTE | | | | | | DETERMINATION |
|---|---|---|---|---|---|---|---|---|---|---|---|---|---|---|
| | | | | | | | | a | b | c | d | e | f | |
| PHOTOGRAPH COLLECTION | CUSTOMER1 | 1 | | Ca11 | Da11 | p PHOTOGRAPH | Qa11p | | | | | | | OK |
| | | | | | | l CHARACTER, LINE DRAWING | Qa11l | | | | | | | OK |
| | | 2 | | Ca12 | Da12 | p PHOTOGRAPH | Qa121p | | | | | | | NG |
| | | | | Ca12 | Da12 | p PHOTOGRAPH | Qa121p | | | | | | | OK |
| | | | | Ca12 | Da12 | l CHARACTER, LINE DRAWING | Qa122l | | | | | | | OK |
| | | | | ·· | ·· | | | | | | | | | |
| | CUSTOMER2 | | | Ca21 | Da21 | p PHOTOGRAPH | Qa21 | | | | | | | ·· |
| | ·· | | | ·· | ·· | i ILLUSTRATION | ·· | | | | | | | ·· |
| CATALOG | CUSTOMER1 | | | Cb11 | Db11 | l CHARACTER, LINE DRAWING | Qb11 | | | | | | | ·· |
| | | | | Cb12 | Db12 | g GRAPH | Qb12 | | | | | | | ·· |
| | | | | ·· | ·· | | ·· | | | | | | | ·· |
| | CUSTOMER3 | | | Cb31 | Db31 | | Qb31 | | | | | | | ·· |
| | ·· | | | ·· | ·· | | ·· | | | | | | | ·· |
| HANDBILL | | | | | | | | | | | | | | |
| ·· | | | | | | | | | | | | | | |

FIG.7

| PRINTER NAME | MAXIMUM PAPER SIZE | AVAILABLE PAPER NAME | VARIOUS OUTPUT CONDITIONS | | | | | | | PRODUCTIVITY D | COSTS C | IMAGE QUALITY INDEX Q | | | | | | CONTENT TYPE | OVERALL IMAGE QUALITY INDEX Q |
|---|---|---|---|---|---|---|---|---|---|---|---|---|---|---|---|---|---|---|---|
| | | | PRINT SPEED | RESOLUTION | PRINT DIRECTION | PAPER DIRECTION | PAPER TYPE | INK REDUCTION LEVEL | USED INK AMOUNT | | | ITEM a | ITEM b | ITEM c | ITEM d | ITEM e | ITEM f | | |
| PRINTER 1 | | | | | | | | | | | | Qa | Qb | Qc | Qd | Qe | Qf | p PHOTOGRAPH | Qp |
| | | | | | | | | | | | | | | | | | | i CHARACTER, LINE DRAWING | Qi |
| | | | | | | | | | | | | | | | | | | i ILLUSTRATION | Qi |
| | | | | | | | | | | | | | | | | | | g GRAPH | Qg |
| | | | | | | | | | | | | | | | | | | .. | |
| PRINTER 2 | | | | | | | | | | | | | | | | | | | |
| .. | | | | | | | | | | | | | | | | | | | |

FIG.10

| | | b | c | d |
|---|---|---|---|---|
| USAGE 3 (HANDBILL) | PREFERENCE 3-2 | | | |
| | PREFERENCE 3-1 | | LARGE | LARGE |
| | AVERAGE 3-0 | | | |
| USAGE 2 (CATALOG) | PREFERENCE 2-2 | | | |
| | PREFERENCE 2-1 | | | |
| | AVERAGE 2-0 | | | |
| USAGE 1 (PHOTOGRAPH COLLECTION) | PREFERENCE 1-2 | | | |
| | PREFERENCE 1-1 | | | |
| | AVERAGE 1-0 | | | |

FIG.23

AT TIME OF OUTPUT CONDITION SELECTION   340

| JOB ID | 1 2 3 4 5 | 341 |
| CUSTOMER ID | abced | 342 |

ORDER CONTENT

*** · · ·   344

| REQUEST | | SIZE | NUMBER OF PAGES | NUMBER OF COPIES | PAPER | POST-PROCESSING SPECIFICATION INFORMATION |
| --- | --- | --- | --- | --- | --- | --- |
| DELIVERY DATE | BUDGET | | | | | |
| | | M x N [mm] | aa | 10000 | COATED PAPER | *** |

346

PLEASE SELECT TARGET Q
BY SLIDER BAR AND PRESS SELECTION BUTTON

AVAILABLE PRINTER LIST   360

350 → 
356 →
352 →

Q
CUSTOMER'S HISTORY
OK
NG
FREQUENCY
OK NUMBER, NG NUMBER

SELECTION   358

| NUMBER | PRINTER NAME / PRINTER ID | OPERATION SCHEDULE / OPERATION STATUS |
| --- | --- | --- |
| 1 | PRINTER A | |
| 2 | PRINTER B | |
| ... | | |

PLEASE INPUT NUMBER CORRESPONDING TO OUTPUT PRINTER
AND PRESS DECISION BUTTON

PRINTER NUMBER : 2    DECISION 362            364

FIG.25

AT TIME OF REGISTRATION
OF CUSTOMER EVALUATION RESULT      420

| JOB ID | 12345 | ~421 |
| CUSTOMER ID | abced | ~422 |
| EVALUATION TIME AND DATE | 2012/Jan/01  13:00 | ~424 |
| EVALUATION CONDITIONS | LIGHTING CONDITIONS:*** | ~426 |

CUSTOMER COMMENT

NG,
REASON IS THAT
...

a...  OK 434   436

REGISTRATION 438   432

~430

PRINTING MANAGEMENT DEVICE AND METHOD, PRINTING MANAGEMENT SYSTEM, PRINTING SYSTEM INFORMATION PROCESSING DEVICE AND RECORDING MEDIUM FOR DECIDING A PRINTOUT CONDITION

CROSS-REFERENCE TO RELATED APPLICATIONS

This application is a Continuation of U.S. application Ser. No. 14/554,669, filed Nov. 26, 2014, which is a Continuation of PCT International Application No. PCT/JP2013/063762 filed on May 17, 2013, which claims priority under 35 U.S.C. §119(a) to Japanese Patent Application No. 2012-121173 filed on May 28, 2012. Each of the above applications is hereby expressly incorporated by reference, in their entirety, into the present application.

BACKGROUND OF THE INVENTION

Field of the Invention

The present invention relates to a printing management device, method and system and a recording medium that stores a program, for adaptively selecting a printer to be used from multiple printers or printing conditions. Particularly, the present invention relates to printout management/control techniques suitable for realization of services that provide a printed matter on appropriate output conditions according to an order from a customer.

Description of the Related Art

Japanese Patent Application Laid-Open No. 2001-134399 (PTL 1) discloses a system that selects an optimal printer from a group of multiple printers based on viewpoints of output image quality, printing time and printing cost (paragraphs [0065] to [0069] of PTL 1). Japanese Patent No. 4037011 (PTL 2) discloses a printer selection apparatus that analyzes printing data to predict output image quality, and selects a printer used for printing according to an image quality level condition specified by an operator and printing completion expected time. Japanese Patent No. 4298050 (PTL 3) discloses a method of visualizing a tradeoff of image quality versus costs with respect to operation of image processing parameters that influence image quality at the time of printout, and enabling a customer to select a printout image. Specifically, by presenting a graph showing a change in the image quality with respect to a percentage of under color removal (UCR) and a graph showing a relationship of costs of coloring agents to the customer, the customer can perform setting taking into account the image quality versus costs.

SUMMARY OF THE INVENTION

In printing services that provide printed, matters according to orders from customers, there is a case where information on target image quality (request image quality) of output image quality or the like is not necessarily presented from the customers in an explicit manner. The output image quality requested by the customers varies by a customer or by usage/kind of a printed matter, and it is desired to decide output conditions (such as a printing machine to be used and printing conditions thereof, and such various conditions are collectively referred to as "printout conditions" below) at optimal balance against trade-off relationships among target image quality, costs and delivery date, and so on.

However, in the technique of PTL 1, it is not possible to deal with a situation in which explicit target image quality is not presented from a customer.

In the technique of PTL 2, since an operator has to decide the target image quality level for each printing job in a trial-and-error manner, an operating efficiency is bad.

In the technique of PTL 3, in a case where a specific printer does not attain a request level (it does not attain the request), it is necessary to give up an output or search for another printer. Moreover, even if the graph showing the trade-off relationship between image quality and costs is presented, it is difficult for the customer to determine the quality of an actual printed matter from information on image quality shown by numerical values.

The present invention is made in view of such circumstances, and it is an object to provide a printing management device, method and system, an information processing device and a recording medium that stores a program, for enabling provision of a printed matter on printout conditions of optimal balance with respect to tradeoff relationships among quality, costs and delivery date, and so on, according to a customer request even under conditions on which request image quality requested by the customer is not explicit.

To achieve the above-mentioned object, the following invention is provided.

(First Mode)

There is provided a printing management device configured to decide output conditions of a printed matter according to a customers order information, including: a customer property database configured to accumulate history data associated with classification information on at least one of usage and content type of a printed matter provided in past dealings with each customer, an image quality index showing quality of the printed matter by a numerical value and customers evaluation with respect to the printed matter; a printer property database configured to record printer property data in which conditions at a time of printing in each printer of multiple printers and an image quality index realized on the conditions are associated; target image quality index decision means configured to decide a target image quality index showing target quality of a printed matter according to the order information using the history data accumulated in the customer property database; and printout condition decision means configured to select a printer to be used to acquire a printed matter based on the order information, and conditions at a time of printing, with reference to the printer property database according to the order information and the target image quality index, and output information on selected output conditions.

The printing management device can be realized by a computer system using one or multiple computers. For example, the target image quality index decision means can be configured to include a calculation processing function to automatically decide a target image quality index on the basis of the history data accumulated in the customer property database. Alternatively, the target image quality index decision means can be configured to support the decision of setting of a target image quality index by an operator by displaying information on the history data or information acquired by processing the history data on a display, and decide a target image quality index on the basis of information input by operation of the operator.

The usage of a printed matter can be estimated from manuscript submission data for output or a print model (comp). For example, it is possible to assume a configuration including content type determination means for automatically determining the kind (content type such as a photograph, character, line drawing and illustration) of elements forming the image content of a printed matter, and their image regions, it is possible to automatically determine the usage of a printed matter from the content type and its area ratio automatically determined by the content type determination means, and so on.

(Second Mode)

In the printing management device according to the first mode, a configuration is possible in which the image quality index is defined in association with a physical quantity that can be actually measured from a print result.

(Third Mode)

In the printing management device according to the first or second mode, a configuration is possible in which the image quality index is defined by a calculation equation combining numerical values respectively based on multiple image quality attributes.

For example, the image quality attribute includes noise, color gradation, sharpness, character property, gloss and stripe unevenness, and so on. The evaluation value of each attribute is defined in association with one or multiple physical measurement values. It can be assumed that the image quality index shows the overall quality defined by combining respective numerical values (evaluation values) of multiple image quality attributes. For example, it can be assumed to define the image quality index by a calculation equation of linear calculation that multiplies an arbitrary weighting coefficient by respective numerical values of multiple image quality attributes and adding the results.

(Fourth Mode)

In the printing management device according to any one of the first to third modes, a configuration is possible in which the history data accumulated in the customer property database includes information on costs and delivery date of the printed matter provided in the past dealings.

By such a mode, it is possible to estimate an optimal balance of the quality, costs and delivery date of each usage for each customer.

(Fifth Mode)

In the printing management device according to any one of the first to fourth modes, a configuration is possible including image quality distribution generation means configured to generate image quality distribution data showing distribution of image quality indices that satisfy customer's request quality, from the history data accumulated in the customer property database, where the image quality distribution data is used when the target image quality index is decided, For example, information showing that a customer satisfies the quality of a printed matter (referred to as "OK information") is recorded in a customer property database as customer's reaction evaluation) with respect to the printed matter provided to the customer in past dealings. Alternatively, a mode is also possible in which only history data of a printed matter satisfied (OK) by a customer is accumulated in the customer property database.

By processing the history data accumulated in the customer property database, it is possible to generate image quality distribution data of OK quality (OK image quality distribution data) with results for each usage per customer. Moreover, it is possible to generate average value data of OK image quality distribution data of multiple customers and estimate OK quality for new usage from similar usage or content type, and so on.

By using such distribution information, it is possible to decide an appropriate target image quality index.

(Sixth Mode)

In the printing management device according to the fifth mode, a configuration is possible in which: the image quality distribution generation means generates NG image quality distribution data showing distribution of image quality indices that does not reach customer's request quality, from the history data accumulated in the customer property database; and the NG image quality distribution data is a used when the target image quality index is decided, For example, as customer's evaluation with respect to a printed matter provided to the customer in past dealings, OK information is recorded in the customer property database in a case where the customer satisfies the quality of the printed matter, and information showing that customer's request quality is not reached (referred to as NG information) is recorded in the customer property database in a case where it is not satisfied. Further, OK image quality distribution data and NG image quality distribution data are generated respectively, and the target image quality index is decided on the basis of these OK/NG image quality distribution information.

(Seventh Mode)

In the printing management device according to the fifth or sixth mode, a configuration is possible including: distribution information presentation means configured to present image quality distribution information based on the data generated by the image quality distribution generation means to an operator; and user interface presentation means configured to present the image quality distribution information and presenting an operation screen that receives setting operation of the target image quality index from the operator.

According to this mode, it is possible to specify an appropriate target image quality index with reference to distribution information.

(Eighth Mode)

There is provided a print management method of deciding output conditions to provide a printed matter according to a customer's order, where the method prepares: a customer property database configured to accumulate history data associated with classification information on at least one of usage and content type of a printed matter provided in past dealings with each customer, an image quality index showing quality of the printed matter by a numerical value and customer's evaluation with respect to the printed matter; and a printer property database configured to record printer property data in which conditions at a time of printing in each printer of multiple printers and an image quality index realized on the conditions are associated, and the method includes: a target image quality index decision step of deciding a target image quality index showing target quality of a printed matter according to a customers order information using the history data accumulated in the customer property database; and a printout condition decision step of selecting a printer to be used to acquire a printed matter based on the order, and conditions at a time of printing, with reference to the printer property database according to the order information and the target image quality index, and outputting information on selected output conditions.

Regarding the method invention of the eighth mode, a mode is possible in which features similar to the matters described in the second to seventh modes are combined. In this case, a matter specified as "means" can be understood as "process" or "step" corresponding to the operation, processing and function of the means.

(Ninth Mode)

There is provided a printing management system including: an order reception apparatus configured to receive an input of order information on a printed matter requested by a customer; and a printing management device according to any one of the first to seventh modes. For example, this printing management system can be realized by a computer system using a network including a LAN (Local Area Network), a WAN (Wide Area Network) or a combination of these.

(Tenth Mode)

In the printing management system according to the ninth mode, a configuration is possible including a database management apparatus configured to update each of the customer property database and the printer property database.

The database management device may be included for each database or a database management apparatus that comprehensively manages multiple databases may be included.

(Eleventh Mode)

In the printing management system according to the ninth or tenth mode, a configuration is possible including image data storage means configured to store image data of the printed matter requested by the customer, where the image data is provided from the image data storage means to a printer of output destination corresponding to the output conditions selected in the printing management device.

(Twelfth Mode)

There is provided a printing system including: a printing management system according to any one of the ninth to eleventh modes; and the multiple printers, where the printing system adaptively decides the output conditions for a customer's order information acquired through the order reception apparatus, operates a corresponding printer according to the decided output conditions and produces a printed matter.

According to this mode, it is possible to realize a print service that can provide a printed matter, which is printed on appropriate output conditions according to the order of a customer who is a client, to the customer.

(Thirteenth Mode)

There is provided a print management program which decides output conditions of a printed matter according to a customer's order information and which causes at least one computer to function as: a customer property database configured to accumulate history data associated with classification information on at least one of usage and content type of a printed matter provided in past dealings with each customer, an image quality index showing quality of the printed matter by a numerical value and customer's evaluation with respect to the printed matter; a printer property database configured to record printer property data in which conditions at a time of printing in each printer of multiple printers and an image quality index realized on the conditions are associated; target image quality index decision means configured to decide a target image quality index showing target quality of a printed matter according to the order information using the history data accumulated in the customer property database; and printout condition decision means configured to select a printer to be used to acquire a printed matter based on the order information, and conditions at a time of printing, with reference to the printer property database according to the order information and the target image quality index, and output information on selected output conditions.

In a case where respective functions of the customer property database, the printer property database, the target image quality index decision means and the printout condition decision means are realized by a combination of multiple computers, a program to realize respective functions is provided.

Regarding the program of the thirteenth mode, a mode is possible in which features similar to the matters described in the second to seventh modes are combined. In this case, a function specified as "means" is understood as a program to be realized by a computer.

(Fourteenth Mode)

There is provided an information processing device used for a printing management system configured to decide output conditions of a printed matter according to a customer's order information, including: a customer property database configured to accumulate history data associated with classification information on at least one of usage and content type of a printed matter provided in past dealings with each customer, an image quality index showing quality of the printed matter by a numerical value and customer's evaluation with respect to the printed matter; target image quality index decision means configured to decide a target image quality index showing target quality of a printed matter according to the order information using the history data accumulated in the customer property database; and communication means configured to transmit the target image quality index through a network, where the target image quality index is transmitted, through the network by the communication means, to the printing management system including: a printer property database configured to record printer property data in which conditions at a time of printing in each printer of multiple printers and an image quality index realized on the conditions are associated; and printout condition decision means configured to select a printer to be used to acquire a printed matter based on the order, and conditions at a time of printing, with reference to the printer property database according to the order information and the target image qua index, and output information on selected output conditions.

The information processing device according to this mode includes the customer property database, the target image quality index decision means and the communication means, and can transmit the target image quality index to the printing management system through the network.

The printing management system including the printer property database and the printout condition decision means can be used on the network, and, based on the target image quality index transmitted from an information processing device, appropriate output conditions are selected with reference to the printer property database.

(Fifteenth Mode)

There is provided an information processing program which is used in a printing management system configured to decide output conditions of a printed matter according to a customer's order information and which causes at least one computer to function as: a customer property database configured to accumulate history data associated with classification information on at least one of usage and content type of a printed matter provided in past dealings with each customer, an image quality index showing quality of the printed matter by a numerical value and customer's evaluation with respect to the printed matter; target image quality index decision means configured to decide a target image quality index showing target quality of a printed matter according to the order information using the history data accumulated in the customer property database; and communication means configured to transmit the target image quality index through a network, where the target image quality index is transmitted, through the network by the communication means, to the printing management system including: a printer property database configured to record printer property data in which conditions at a time of printing in each printer of multiple printers and an image quality index realized on the conditions are associated; and printout condition decision means configured to select a printer to be used to acquire a printed matter based on the order, and conditions at a time of printing, with reference to the printer property database according to the order information and the target image quality index, and output information on selected output conditions.

(Sixteenth Mode)

There is provided an information processing device used for a printing management system configured to decide output conditions of a printed matter according to a customer's order information, including: communication means configured to be connected with a network and transmitting and receiving information through the network; order information reception means configured to receive order information on the customer through the network; target image quality index inquiry means configured to make an inquiry of a target image quality index to target image quality index decision means by transmitting classification information included in the order information through the network from the communication means to a first server, and receive a target image quality index decided by the target image quality index decision means through the network, the first server including: a customer property database configured to accumulate history data associated with the classification information on at least one of usage and content type of a printed matter provided in past dealings with each customer, an image quality index showing quality of the printed matter by a numerical value and customer's evaluation with respect to the printed matter; and the target image quality index decision means configured to decide a target image quality index showing target quality of a printed matter according to the order information using the history data accumulated in the customer property database, and output condition inquiry means configured to make an inquiry of output conditions by transmitting the target image quality index through the network from the communication means to a second server, and receive information on output conditions selected by printout condition decision means through the network, the second server including: a printer property database configured to record printer property data in which conditions at a time of printing in each printer of multiple printers and an image quality index realized on the conditions are associated; and the printout condition decision means configured to select a printer to be used to acquire a printed matter based on the order, and conditions at a time of printing, with reference to the printer property database according to the order information and the target image quality index, and output information on selected output conditions.

The information processing device according to this mode includes the communication means, the order information reception means, the target image quality index inquiry means and the output condition inquiry means. The first server and the second server are connected on the network, and the information processing device makes an inquiry of the target image quality index to the first server and makes an inquiry of output conditions to the second server. The information processing device can receive an answer (search processing result) with respect to these inquiries from each server.

(Seventeenth Mode)

There is provided an information processing program which is used in a printing management system configured to decide output conditions of a printed matter according to a customer's order information and which causes at least one computer to function as: communication means configured to be connected with a network and transmitting and receiving information through the network; order information reception means configured to receive order information on the customer through the network; target image quality index inquiry means configured to make an inquiry of a target image quality index to target image quality index decision means by transmitting classification information included in the order information through the network from the communication means to a first server, and receive a target image quality index decided by the target image quality index decision means through the network, the first server including: a customer property database configured to accumulate history data associated with the classification information on at least one of usage and content type of a printed matter provided in past dealings with each customer, an image quality index showing quality of the printed matter by a numerical value and customer's evaluation with respect to the printed matter; and the target image quality index decision means configured to decide a target image quality index showing target quality of a printed matter according to the order information using the history data accumulated in the customer property database; and output condition inquiry means configured to make an inquiry of output conditions by transmitting the target image quality index through the network from the communication means to a second server, and receive information on output conditions selected by printout condition decision means through the network, where the second server includes: a printer property database configured to record printer property data in which conditions at a time of printing in each printer of multiple printers and an image quality index realized on the conditions are associated; and the printout condition decision means configured to select a printer to be used to acquire a printed matter based on the order, and conditions at a time of printing, with reference to the printer property database according to the order information and the target image quality index, and output information on selected output conditions.

According to the present invention, even in a case where customer's request image quality is not explicit in order information, it is possible to decide appropriate output conditions with reference to a customer property database and a printer property database, and provide a printed matter that satisfies the customer's request image quality.

BRIEF DESCRIPTION OF THE DRAWINGS

FIG. 4 is a chart illustrating a configuration example of a customer property database (DB);

FIG. 7 is a chart illustrating a configuration example of a printer property database (DB);

FIG. 10 is a diagram illustrating a data example of customer's preference information generated from a customer property DB;

FIG. 23 is a diagram illustrating a GUI screen example used when a target Q is set;

FIG. 25 is a diagram illustrating a GUI screen example used when customer's evaluation with respect to a provided printed matter is registered.

DETAILED DESCRIPTION OF EXEMPLARY EMBODIMENTS

In the following, modes to implement the present invention are described in detail according to the accompanying drawings.

[Explanation of Basic Concept]

Figure 1:
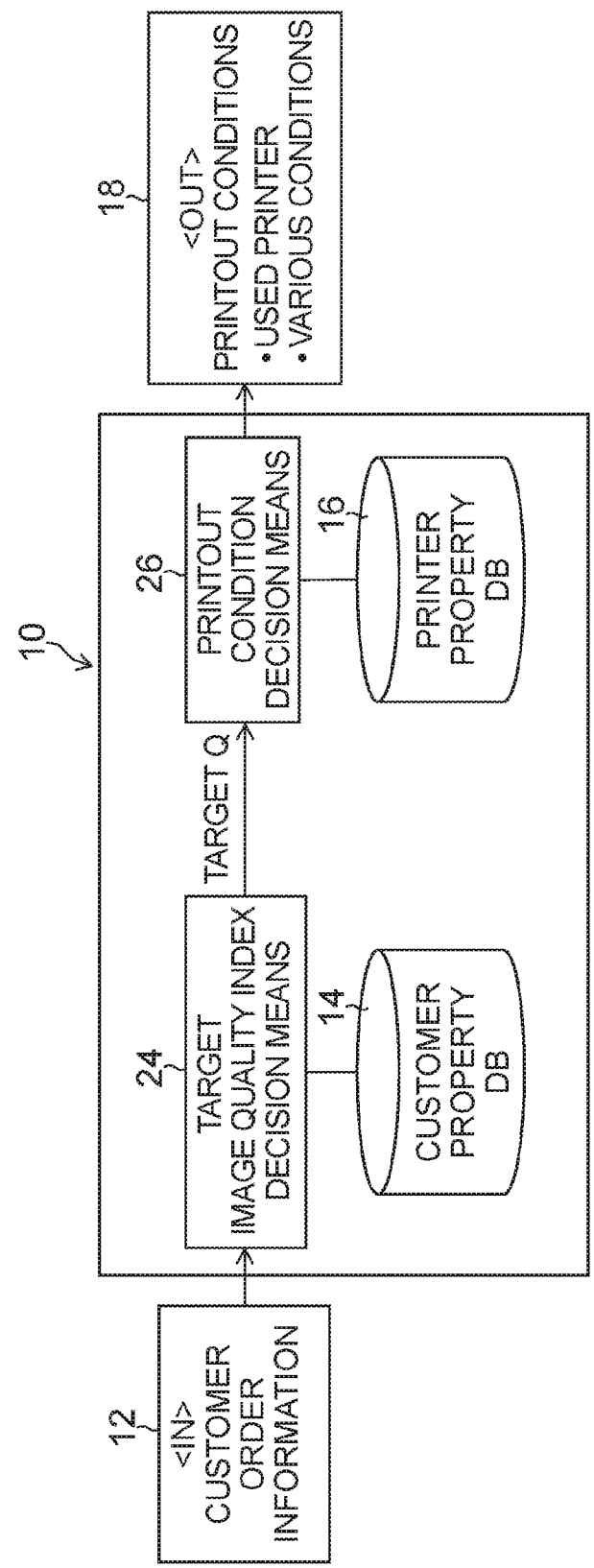
FIG. 1 is a block diagram illustrating a basic configuration of a printing management device according to an embodiment of the present invention.

FIG. 1 is a block diagram illustrating a basic configuration of a printing management device according to the first embodiment of the present invention. A printing management device 10 is an apparatus that decides an optimal printout condition from order information of a customer who requests a printed matter (hereinafter referred to as "customer order information"), with reference to a customer property database (DB) 14 and a printer property database (DB) 16, and has a function of outputting (OUTPUT) the decided information (referred to as "printout condition information") 18 to the outside, The customer order information 12 can include information (for example, an orderer name and a customer identification number, and so on) to specify an orderer (customer), and information on the usage of a printed matter (for example, photograph collection, catalog and publicity handbill, and so on) and a model (sample), number, price and delivery date, and so on, of the printed matter. The customer order information 12 may be part of the information exemplified here or other information may be added.

The customer property DB 14 denotes a data group that accumulates information on order contents and results (history) by past dealings for each customer who is an orderer (person who made an order). In the customer property DB 14 of this example, for each customer, image quality acknowledged (recognized as OK) by the customer in the past is described by the numerical value of an indicator called "image quality index" for each usage or content type of a printed matter. The image quality index denotes an indicator that defines the image quality of a printed matter, and is defined as a numerical value including the evaluation of at least one kind or preferably multiple kinds of image quality attributes associated with the physical quantity that can be actually measured from the printed matter, and so on. A concrete example of the image quality index is described later. Here, in the present specification, the image quality index is written by a sign of "Q".

The printer property DB 16 denotes a data group that describes the performance (property) of each printer of multiple printers (printing machines). The printer property DB 16 of this example is described by the image quality index for each printer and each combination of various output conditions.

The printing management device 10 includes means (target image quality index decision means) 24 configured to decide the target image quality index of a printed matter associated with the order, on the basis of the input customer order information 12 and the customer property DB 14. Moreover, the printing management device 10 includes means (printout condition decision means) 26 configured to select a printer to be used for printing according to the target image quality index and the printer property DB 16 and deciding printing conditions, and so on.

Such printing management device 10 can be realized by a combination of hardware and software of one or multiple computers (which may include peripheral equipment thereof). Moreover, the printing management device 10 can be realized by cloud computing.

A program that causes a computer to realize the function of each means of the printing management device 10 may be installed in the computer beforehand or may he provided in a state where the program is stored in a magnetic disk, an optical disk, a magneto-optical disk and a memory card or recorded in other computer-readable media (information storage media). Moreover, instead of a mode to store the program in such a storage medium of a tangible entity and provide it, it is also possible to provide a program signal through a download service by the use of a communication network such as the Internet.

<Regarding Image Quality Index>

Figure 2:
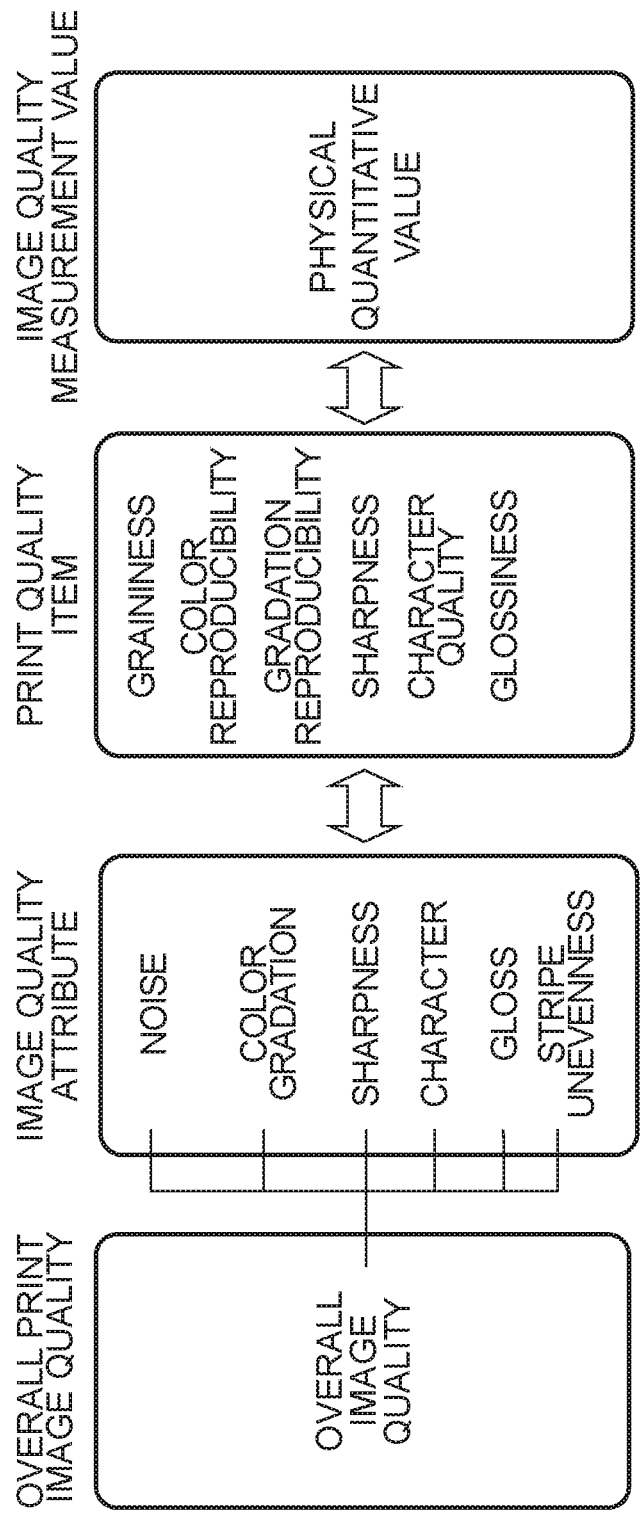
FIG. 2 is an explanatory diagram of image quality indices.

FIG. 2 is an explanatory diagram of an image quality index. The image quality index of this example denotes an indicator that defines the overall image quality of a printed matter and is defined as a value combining the evaluations of multiple image quality attributes. That is, the overall image quality can be shown by a tree structure of multiple image quality attributes, and is understood as quality taking into account each attribute in an integral manner. In the example of FIG. 2, six kinds of image quality attributes of image noise, color gradation, sharpness, character property, gloss and stripe unevenness are shown as the image quality attribute. Part of six kinds of image quality attributes exemplified here may be used or other image quality attributes may be further added.

Individual attributes are associated with one or multiple items of print quality, and the image quality attribute and the print quality item can he estimated from the physical quantity (which corresponds to "physical measurement value" and is described as "image quality measurement value" in FIG. 2) that can be actually measured from a print result, and so on.

Figure 3:
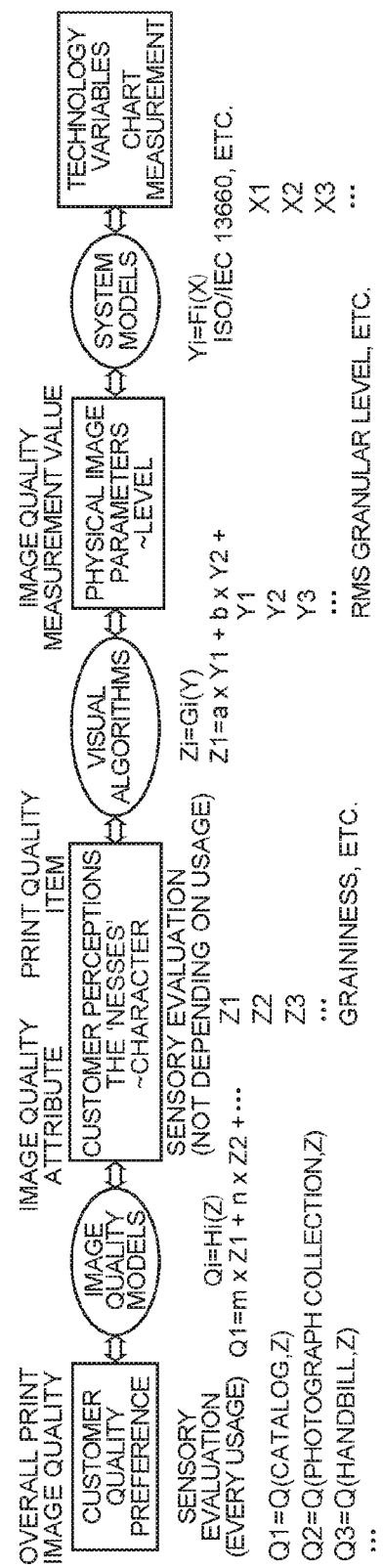
FIG. 3 is a conceptual diagram illustrating how to calculate an image quality index.

FIG. 3 is a conceptual diagram illustrating how to acquire an image quality index. Here, as a reference document to describe the concept illustrated in FIG. 3, there is "Peter G. Engeldrum, "Psychometric Scaling: a toolkit for imaging systems development", pp. 8-17, 2000".

The values of physical technology variables are acquired by printing a test chart or a real image and measuring the print result. This measured technology variable is shown by reference character "X" and the specific values are written by X1, X2 and X3, and so on.

Value X acquired by measurement such as chart measurement and physical image parameter (physical quantitative value) Yi are associated according to a predetermined system model. For example, ISO/IEC 13660 related to a measurement method of hard copy image quality, and so on, can be applied to the system model. From value X acquired by the chart measurement, and so on, physical image parameter (physical quantitative value) $Yi=fi(X)$ as an image quality measurement value is acquired according to function $Fi(X)$ defined by the system model.

The physical image parameter described here denotes a physical evaluation value (indicator) that is generally culled " . . . level" such as an RMS (root mean square granularity) granular level. There may be multiple kinds of such physical image parameters.

Customer perception (customer perceptibility) corresponding to an image quality attribute or print quality item denotes a sensory evaluation value generally called " . . . character" such as a granular character. This sensory evaluation value (shown by Zi in the figure) is shown as a numerical value that does not depend on the usage.

Sensory evaluation value Zi showing an image quality attribute (or print quality item) is calculated according to a function $Gi(Y)$ defined by a visual algorithm ($Zi=Gi(Y)$).

Customer quality preference customer's image quality preference) corresponding to the overall print image quality denotes the sensory evaluation value of overall image quality combining multiple image quality attributes. This overall image quality is defined for each usage. Evaluation value Qi of the overall image quality is calculated by function $Hi(Z)$ defined by an image quality model, and different function $Hi(Z)$ is defined for each usage.

As a simple example, each model and algorithm to associate each of physical quantity X, image quality measurement value Y, image quality attribute (or print quality item) Z and overall print image quality Q acquired by actual measurement may be a linear model. To be more specific, a specific function is decided through an assessment experiment, and so on.

The correspondence relationships (function shown by Fi, Gi and Hi) among sensory evaluation values Qi and Zi and physical quantitative values (physical evaluation values) X and Y is calculated beforehand. At that time, regarding the relationship between overall print image quality Qi and image quality attribute/print quality item (Zi), a model parameter is optimized for each usage of a printed matter.

For example, for usage of "photograph collection" with many photographs, and so on, an image quality attribute related to images is valued. Meanwhile, for usage of "document" with many characters, an image quality attribute related to characters is valued.

The operation of overall print image quality Qi may be a linear model of multiple regression analysis, a linear model by a weight coefficient corresponding to the area ratio of a content type or a nonlinear model. Thus, overall image quality Qi for catalogs, overall image quality Q2 for photograph collection and overall image quality Q3 for handbills, and so on, are calculated according to function Hi defined for each usage.

The overall image quality that evaluates multiple image quality attributes in an overall manner is used as an image quality index in the present embodiment, but the present invention is not limited to this. Instead of the overall image quality, a simple substance of individual image quality attributes before overall evaluation or an arbitrary combination of these may be used as the image quality index, <Configuration Example of Customer Property DB>

FIG. 4 is a diagram illustrating a configuration example of customer property DB. As illustrated in the figure, in the customer property DB 14, an image quality index (which may be written as "OK_Q") in which the request quality of a customer is satisfied with respect to conditions of the usage and content type of each customer and an image quality index (which may be written as "NG_Q") in which the request quality of the customer is not reached are managed together with information to identify the customer (such as the customer name and the customer ID). OK_Q designates an image quality index in which customer's acknowledgment/approval (OK determination) with respect to a provided printed matter is gained. NG_Q designates an image quality index in which the provided printed matter cannot satisfy the customer's request quality and refusal/disapproval (NG determination) is expressed from the customer. Such data can be accumulated from results of deliverables with respect to past orders as historical information. That is, the image quality index of a provided printed matter and the customer's evaluation (OK or NG) with respect to the printed matter are associated through dealings with the customer and preserved in a customer property DB as history data, Since requested quality of a printed matter greatly varies depending on the usage, data is classified from the viewpoint of "usage" in the customer property DB 14. Moreover, various contents such as a photograph part, a character part, a line drawing part and an illustration part, may be included in the image (one picture) of the printed matter. The viewpoint to classify what the elements (contents) forming the image content of the printed matter are, is classification by "content type".

There is a relationship that there is more-detailed small classification of "content type" in large classification of "usage". In the present embodiment, image quality index data is accumulated with respect to a combination of usage and content type.

Other items are not essential, but information on items seemed to have a high utility value is registered in the customer property DB. In the example of FIG. 4, the job ID (identification sign) to identify the print job (Job) of each order, the reception date of the order, costs written as reference character "C") and the delivery date written as reference character "D") are registered. That is, information that the customer is satisfied (OK) or is not satisfied (NG) with respect to image quality (Q), costs (C) and delivery date (D) of a printed matter provided according to the order is accumulated in the customer property DB 14 as a job history in past dealings.

Here, using the overall image quality as image quality index Q in this example, the evaluation values ($Z_i$; i=a, b, c, d, e, f) of image quality attributes (attributes of six kinds of items "a" to "f" here included as evaluation items of the overall image quality are also recorded. Specifically, for example, six kinds of attributes of the noise, color gradation, sharpness, character, gloss and stripe unevenness illustrated in FIG. 2 correspond to "a" to "f". Here, the description is omitted in FIG. 4, but the value respectively corresponding to each cell of the table is described.

Moreover, it is possible to perform various kinds of statistical processing from such a customer property DB. By processing various kinds of data registered in the customer property DB, it is possible to generate various kinds of secondary information such as the preference and tendency of each customer and the average OK level (average value of OK_Q) of all customers. Such secondary information may be generated from the customer property DB 14 at any time according to the necessity on the basis of an instruction of an operator, or may be automatically generated at an arbitrary timing in a regular or irregular manner. Moreover, the generated secondary information (DB processing data) may be incorporated in the customer property DB 14 and held. Moreover, it is also possible to register the secondary information (DB processing data) in another data base and store it in other storage apparatuses.

In the present embodiment, standard parameters such as the average value of multiple customers are held in the customer property DB 14. For example, this standard data is used to guess the request quality of a new customer.

Figure 5:
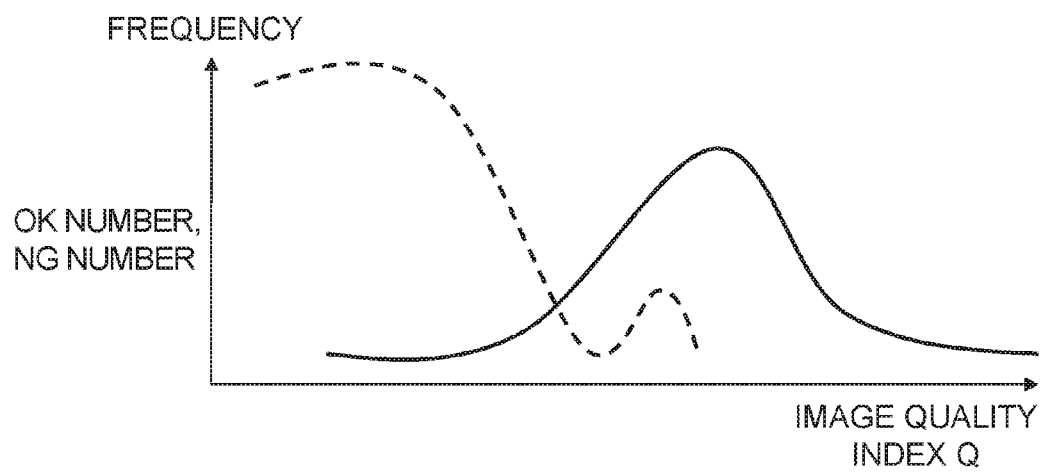
FIG. 5 is a diagram exemplifying distribution of OK/NG with respect to an image quality index.

Moreover, in this example, as a clue to guesses the customer's request quality, distribution data of the image quality index Q, and the OK number and NG number (OK/NG image quality index distribution) as illustrated in FIG. 5 is generated from the customer property DB 14. The histogram of each of the customer's OK determination number and NG determination number with respect to image quality index Q (overall image quality) for each usage can be acquired from image quality index Q of a past delivered printed matter and an accumulation data group of customers evaluation (OK/NG determination) with respect to the printed matter.

The distribution shown by the solid line in FIG. 5 denotes OK number distribution data (OK image quality distribution data). The distribution shown by the dotted line in FIG. 5 denotes NG number distribution data (NG image quality distribution data). Such image quality index distribution can be generated from a data group of the same usage by the use of specific customer's data or can be generated from a data group of the same usage of multiple customers (for example, registered all customers or partial customers).

For example, when a transaction with ti e same customer is conducted many times, distribution where the image quality level (OK_Q) in which the quality of a printed matter is determined to be "OK" and the image quality level (NG_Q) in which it is determined to be "NG" in the customer becomes clear. Regarding a regular customer, the OK/NG image quality index distribution of each usage of the specific customer is generated from data of the customer. Moreover, regarding a new customer, the distribution is created using data of other customers related to the same usage.

Moreover, in the case of new usage that is not registered in the customer property DB the distribution can be estimated using other usage data or the distribution can be estimated using assumption that the items of image quality attributes valued in the new usage or the balance between the items is considered.

In addition, the preference of the specific customer (regular customer), for example, an item that is valued (valued item) and an item that is not so valued (neglected item) in the OK/NG determination can be estimated using the gap of specific customer's data from average data including other customers (for example, standard deviation). Based on such estimation, it is possible to propose a printed matter closer to the preference, with respect to the customer's print request(order).

Figure 6:
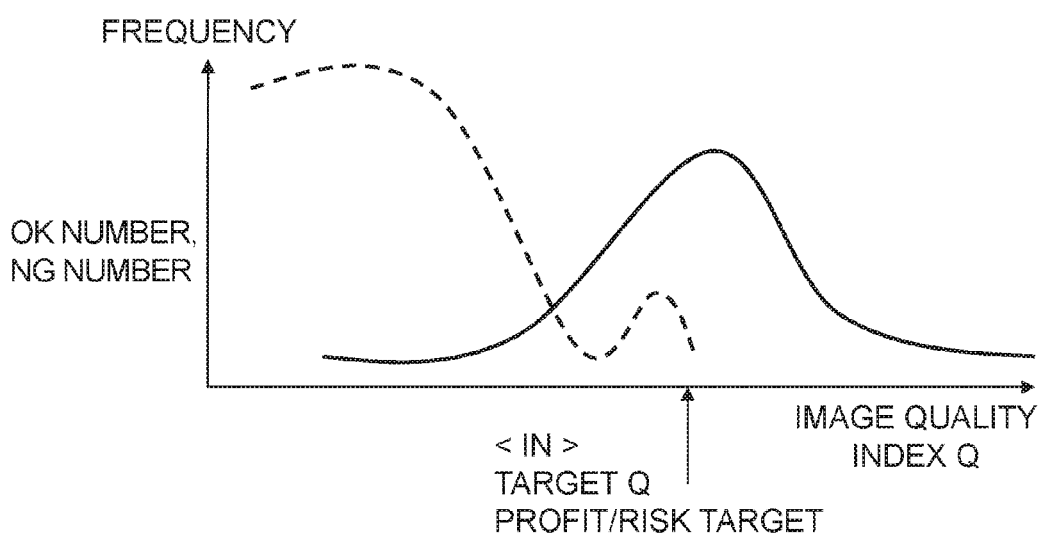
FIG. 6 is an explanatory diagram in a case where a target image quality index is set using distribution data in FIG. 5.

In the present embodiment, as illustrated in FIG. 6, a target image quality index (which may be written as "target Q") is decided using usage OK/NG image quality index distribution generated by processing the customer property DB 14. Here, both the OK image quality distribution data and the NO image quality distribution data are shown in FIGS. 5 and 6, but it is also possible to define target with reference to only the OK image quality distribution data.

Target Q denotes the image quality of a printed matter, which is set as a target by a contractor (a person who received a print order from a customer or a person in a position to have to decide printout conditions by the use of the printing management device 10 of the present embodiment) in feasible image quality. This target Q is shown by "image quality index". In the present embodiment, with reference to the OK/NG image quality index distribution, a mode in which an operator performs operation to specify target Q is described. Here, a mode in which target Q is automatically operated from distribution information is also possible.

In a case where image quality actually realized by a printer is image quality closest to target Q, it may be lower limit image quality that satisfies target Q. As a way of setting actual output image quality with respect to target Q, various settings are possible.

At the time of the decision of target Q, it is desirable to achieve a balance between profit on the order receiving side and a risk, and decide target Q. Moreover, taking into account a demand matter or the like from the orderer customer), the contractor decides "target Q".

"Profit" described here denotes a profit generated by decreasing production costs or increasing the production speed, and so on. This profit denotes a profit of a character that image quality degrades when it is pursued (there is a trade-off relationship between the profit and the image quality).

Production costs C are decided from a printing method (for example, offset and digital print (inkjet and a sublimation scheme, and so on)), an ink amount, a paper type and outside order destination in addition to multiple parameters. When the production speed (productivity) is increased, the time required for generation (production time) shortens, and the shortening of the delivery date becomes possible. That is, the production time has the meaning similar to delivery date D.

The profit is shown by a function of production costs C and production time D. There is a relationship in which the profit increases as C and D decrease, and, by contrast, the profit decreases as C and D increase. When such a relationship is expressed by function f, the profit is shown by a function of a variable that is costs (C) with a minus and a variable that is production time (D) with a minus like the following equation.

$$\text{profit} = f(\text{minus costs } (C), \text{ minus production time } (D)) \quad [\text{Equation 1}]$$

The risk is that there is a possibility that, when a printed matter is provided to a customer, image quality NG is determined by the customer and re-doing or the quitting of dealings is caused. At the time of setting target Q, the profit and the risk are considered to take a balance between Q (image quality) and CD (costs and delivery date).

<Configuration Example of Printer Property DB>

FIG. 7 is a chart illustrating a configuration example of the printer property DB 16. The printer property DB 16 manages image quality index Q with respect to combinations of the printer name and various output conditions. The printer property DB 16 of this example describes image quality indices and the overall image quality index respectively corresponding to multiple kinds of image quality attribute items "a" to "f" per content type, but a mode in which only the image quality index for each image quality attribute item or only the overall image quality index is described is also possible. The printer property DB 16 does not define the usage and it can be defined in the content type as illustrated in FIG. 7, but it may be defined by a combination of the usage and the content type.

It is preferable that productivity D and costs C are also managed in the printer property DB 16. Moreover, regarding other items, it is preferable that items which are not essential registration matters and whose utility value is considered to be higher are registered in the printer property DB 16.

When target Q and necessary specs of a printed matter such as a paper type) are input, the printer property DB 16 is retrieved, and a printer (including outside order destination) that meets specified conditions and candidates of various output conditions are extracted.

Figure 8:
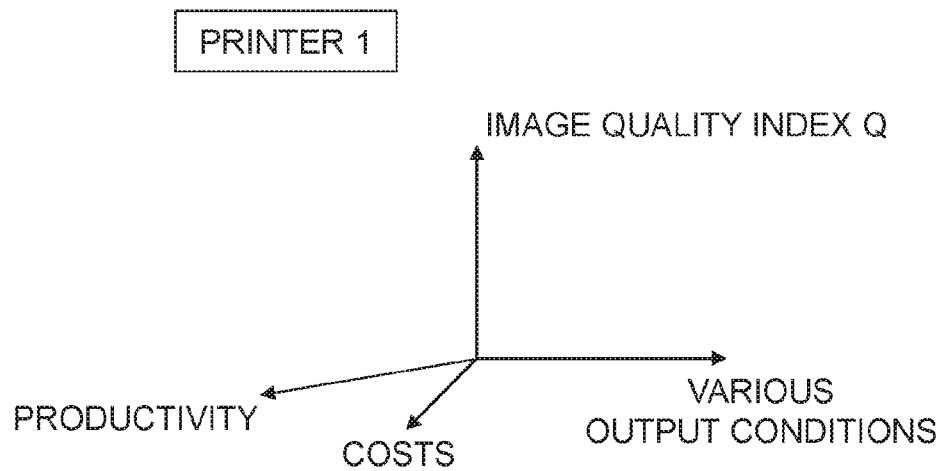
FIG. 8 is a conceptual diagram of printer information registered in a printer property DB.

FIG. 8 is a conceptual diagram of printer information registered in the printer property DB. Here, the printer name to identify a printer is assumed to be "printer 1". For the convenience of illustration, a quality space is drawn where image quality index Q is associated with combinations of parameters of productivity, costs and various output conditions. Actually, as illustrated in FIG. 7, various output conditions are classified into more detailed condition items, and denote multi-dimensional (multi-axial) data including other parameters such as a paper type. That is, in an actual quality space, image quality index Q is further associated with combinations of multi-dimensional item elements. In such a multi-dimensional quality space, the range of a feasible image quality index is specified in the printer. Regarding multiple printers, similarly, information showing the properties of respective printers is registered in the printer property DB 16 beforehand.

When the usage and the content type are understood from the customer order information 12 and target Q is input, a printer (including a printer of outside order destination) that satisfies conditions and output conditions are extracted using the printer property DB 16.

Figure 9:
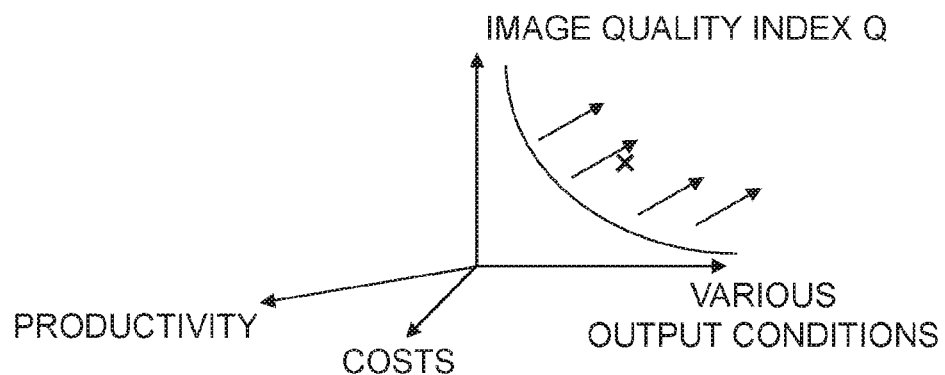
FIG. 9 is a conceptual diagram in a case where a printer suitable for conditions is selected from a printer property DB.

FIG. 9 is a conceptual diagram at the time of printer selection. When the "X" mark in FIG. 9 is assumed to he target Q, a printer within a quality range in which target Q can be realized and output conditions thereof are selected from the printers registered in the property DB 16.

<Concrete Example of Trade-Off Relationship Between Q (Quality) and CD (Costs and Delivery Date)>

(1) Regarding Trade-Off Between C (Costs) and Q (Quality)

For example, when the amount of ink is reduced for cost reduction, there is a tendency that moire and granule become prominent. Meanwhile, when the amount of ink is not reduced, an increase in costs is caused, but mire and granule are less likely to become prominent, and the image quality improves.

Moreover, regarding the kind of a paper to be used (paper type), when a cheap regular paper is used, a color reproduction range is narrow (low image quality). By contrast, when an expensive paper such as an art paper is used, the color reproduction range is wide and high quality is acquired.

(2) Regarding Trade-Off Between D (Delivery Date) and Q (Quality)

In kinds of printers (printing machines), there is one including "low-quality high-productivity mode" and "high-quality low-productivity mode". For example, in the case of an inkjet printing machine, when drawing is performed by larger drops, the productivity becomes higher since it is possible to cover a wide area early, but the roughness of dots becomes prominent. Meanwhile, when drawing is performed by smaller drops, the roughness of dots does not become prominent, but it takes time to cover a wide area and the productivity decreases.

An idea of selecting a printer to be used in the viewpoint of D and Q and an idea of reducing ink in the viewpoint of C and Q are conventionally known.

However, the present embodiment differs from the conventional ideas, and quantifies the quality of a printed matter as an image quality index, introduces a new indicator of this image quality index and optimizes quality (Q), costs (C) and delivery date (D) of the printed matter. The present embodiment provides means configured to define a target image quality index of a printed matter related to an order by the use of the databases (14, 16) described by image quality indices, take into account three elements of QCD and determine appropriate output conditions.

In order information of a print request from a customer, in a case where request image quality requested by the customer is explicitly specified, it only has to perform selection of a printer and selection of output conditions so as to realize the specified request image quality.

Meanwhile, in the order information from the customer, in a case where the request image quality requested by the customer is not explicitly specified, there is some flexibility as to which image quality level the target image quality assumes.

In the present embodiment, even in a case where the customer's request image quality is not explicitly specified, an optimal QCD balance is achieved for the trade-off relationship between Q and CD by the use of the customer property DB.

<Regarding QCD Balance>

As for a QCD balance to be achieved, optimal definition varies for each usage of a printed matter and each customer. Generally, a print company that produces printed matters and provides them to customers considers that it wants to make the printed matters cheaply if equal quality is given for the customers That is, it aims to suppress the material costs (such as an ink cost and a paper cost) per work according to an order while achieving quality which the customer satisfies.

Moreover, the print company considers that it wants to make the printed matters early (in short delivery date) if equal quality is given for the customers. That is, the print company desires to raise the work turnover ratio, handle more work and gain a profit Therefore, the print company aims to reduce the re-doing frequency of work (to reduce the number of times a customer does not satisfy deliverables and printing is performed again).

Moreover, the print company desires to use a printer with a short output time among multiple printers, further taking into account the operation status Specific action examples are shown below.

ACTION EXAMPLE 1

In the case of a contractor who considers wanting a cheap finish if identical quality is given for customers, target Q is adjusted and optimization is performed so as not to have costs C as much as possible. At that time, production time D (delivery date) is considered too. Costs C are suppressed by changing the material quality and used amount of papers (print media) and ink.

ACTION EXAMPLE 2

In the case of a contractor who considers wanting a quick finish if identical quality is given for customers, target Q is adjusted and optimization is performed so as not to take production time (D) as much as possible. At that time, cost C is considered too. Target image quality (target Q) with smaller numbers of repetition is set and a printer (printing machine) with fast printing speed is used.

ACTION EXAMPLE 3

For a customer who values quality and may take costs if high quality is provided, good materials that satisfy target Q are used and, furthermore, optimization is performed so as not to have costs C as much as possible.

<Grasp of Preference of each Customer Related to Image Quality>

It is considered that a QCD balance to be realized can be defined for each usage and customer. For example, depending on whether the usage of the printed matter is "photograph collection", "catalog" or "handbill", the balance of Q (quality), C (costs) and D (delivery date) (which viewpoint is valued) varies. Moreover, the optimum point of the QCD balance varies by customer. It is possible to understand the preference of the QCD balance (tendency as to which item is valued and how it is valued) for each usage and customer by the use of accumulation data of the customer property DB 14 in the present embodiment.

FIG. 10 illustrates an example of data showing the preference of the QCD balance by customer generated from the customer property DB. It is possible to estimate the customer's preference from a deviation (for example, standard deviation) with respect to the average value of multiple items of customer data. "Average 1-0" in the figure designates the average value of all customer data related to usage 1 (photograph collection). "Preference 1-1" designates the preference of customer 1 with respect to usage 1 (photograph collection). "Preference 1-2" designates the preference of customer 2 with respect to usage 1 (photograph collection). Similarly, "average 2-0" designates the average value of all customer data related to usage 2 (catalog), and "preference 2-1" and "preference 2-2" designate the preference of customer 1 and customer 2 with respect to usage 2 (catalog) respectively. "Average 3-0" designates the average value of all customer data related to usage 3 (handbill), and "preference 3-1" and "preference 3-2" designate the preference of customer 1 and customer 2 with respect to usage 3 (handbill) respectively.

As a calculation method of the above-mentioned average values, there is a method of calculating the average value by performing normalization according to the number of orders in a case where the number of orders varies by customer, and a method of calculating the average value while excluding information on a less number of orders which become an outlier from data. Here, the calculation accuracy of the average value may be further improved using general knowledge of statistical processing.

Illustration is omitted in FIG. 10, but, in respective cells corresponding to items of Q, C and D, for example, a numerical value such as a deviation or information showing the valuing level such as "large", "medium" and "small" is attached according to the degree of valuing. Here, only information on customer 1 and customer 2 is shown for the convenience of illustration, but similar data is acquired for each customer. Such data is generated on the basis of information held in the customer property DB. For example, the average value is calculated from data of all customers, the difference from the average value (deviation) is calculated for each customer, and the valuing level is estimated according to the deviation.

<Regarding Means for Determining Usage and Content Type of Print Image>

For example, the usage of a printed matter includes photograph collection, product catalog, pamphlet and publicity handbill, and so on. Moreover, for example, the content type includes a photograph, character, line drawing, illustration and graph chart, and so on. It is possible to determine the usage and the content type on the basis of manuscript submission data presented from a customer who is an orderer or a sample (comp) of a printed matter. Specifically, there is a tendency that usage of "photograph collection" is given in a case where there are many photographs, usage of "catalog" or "pamphlet" is given in a case where there are many graphs or characters, and there are many numerals and characters in the case of handbill usage. From such a tendency and feature, it is possible to understand the usage and the content type. Here, in the printing industry, a model (sample) showing a finished image close to a conclusive printed matter is referred to as "color comp" or simply "comp".

Figure 11:
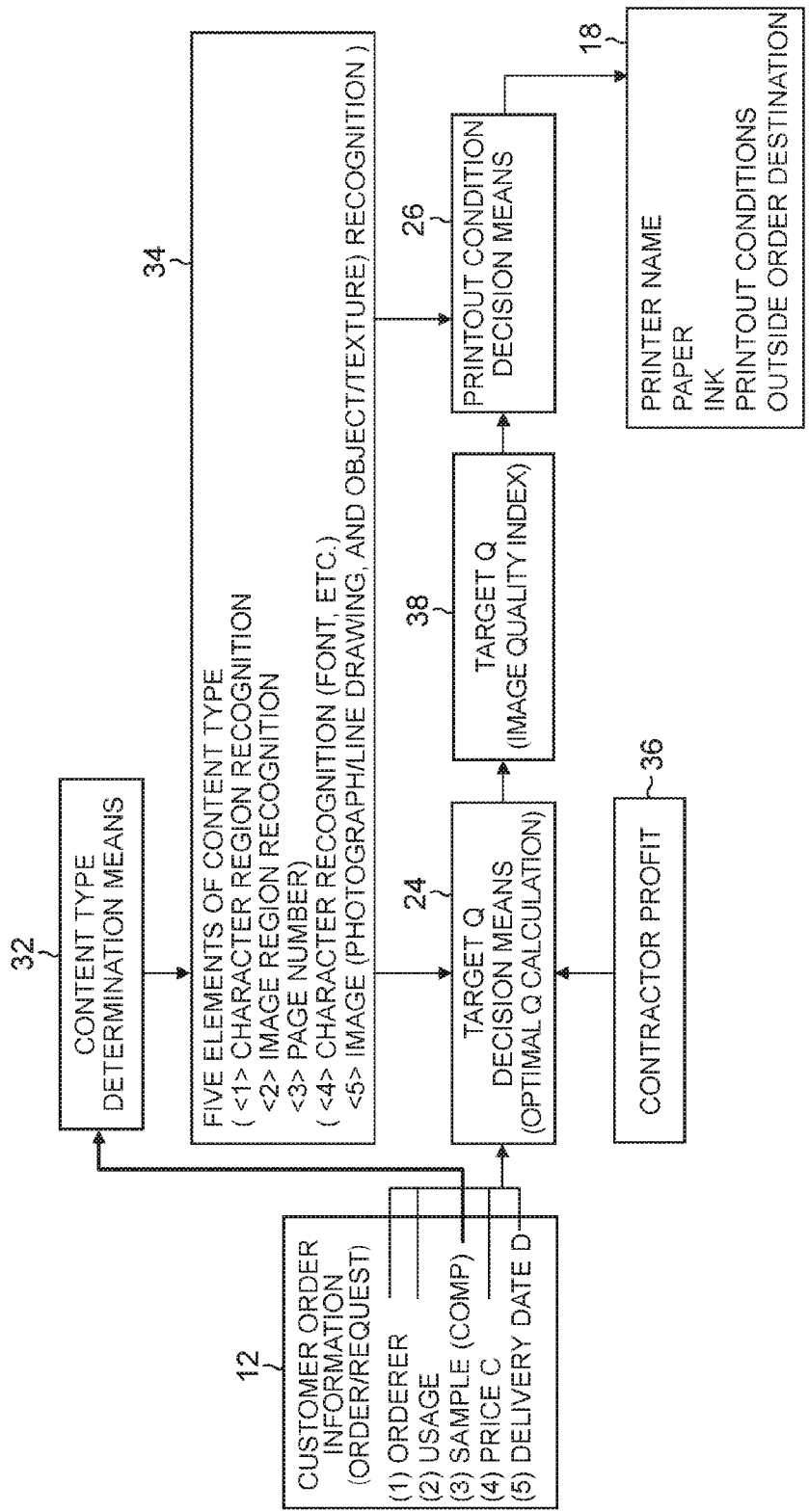
FIG. 11 is an explanatory diagram of a configuration example of a printing management device including content type determination means.

In addition to the basic configuration illustrated in FIG. 1, as illustrated in FIG. 11, it may adopt a configuration adding means (which is referred to as "content type determination means" and illustrated by reference numeral 32) configured to determine the usage and content type of a printed matter from a sample (comp).

As an information element required for calculating optimal Q (target Q) with respect to an order from a customer, there is information on the content type. Determination elements (34) of the content type include five following elements. They are <1> character region recognition, <2> image region recognition, <3> page number, <4> character recognition (font and character size, and so on) and <5> image recognition (discrimination of photograph/line drawing, and discrimination of object/texture, and so on). There is a case where information on such a content type is automatically determined by reading out a comp by a scanner or the like and analyzing the readout image data. Moreover, a configuration in which an operator inputs information on the content type from a predetermined input apparatus (user interface) by hand is possible.

Since the content type is a matter which the operator can input by hand, the content type determination means 32 that performs automatic determination from the comp is not an essential requirement on a system configuration. However, a mode in which a configuration including such content type determination means 32 is adopted is also possible.

The target Q decision means 24 calculates an optimal quality level (optimal Q) from the customer order information 12 and the content type, and decides target Q38. At the time of calculation of optimal Q in the target Q decision means 24, a configuration in which the viewpoint of a contractor profit is considered is possible. Means (with reference numeral 36 in FIG. 11, which is referred to as "contractor profit setting means") configured to perform setting taking into account a contractor profit (including a risk) for the target Q decision means 24 is included.

The contractor profit setting means 36 is not an essential requirement on the system configuration, but, as illustrated in FIG. 6, it is possible to adopt a mode in which target Q is decided taking into account the profit and the risk.

From the quality level and content type decided (calculated) by the target Q decision means 24, an output method of a printed matter a used printer and printout conditions including printing conditions thereof) is decided. Printout condition decision means 26 retrieves the printer property DB 16 on the basis of target Q and the usage/content type, and outputs the printer name, paper, ink and other printing conditions that enable printing matching conditions, in addition to information on outside order destination (printout condition information 18) if necessary.

"Outside order destination" of the printout condition information 18 output from the printout condition decision means 26 is not an essential requirement, but it is possible to construct a system in which an optimal printer is selected from multiple printers including the outside order destination. In this case, it is preferable to output information on outside order destination that holds the selected printer at the same time.

According to the present embodiment, even in a case where the quality level of a customer request in order information is not explicit, it is possible to provide a printed matter of an optimal balance with respect to the trade-off relationship between and CD by the use of the customer property DB 14 that accumulates history data of past dealings.

Moreover, the accumulation data is enhanced by repeating dealings with a customer or performing dealings with many customers and adding history data to the customer property DB 14 (updating the database) at each time. According to an increase in the accumulation data, gradually, it becomes possible to decide target Q with higher accuracy.

<Second Embodiment>

Next, more specific embodiment examples are described.

Figure 12:
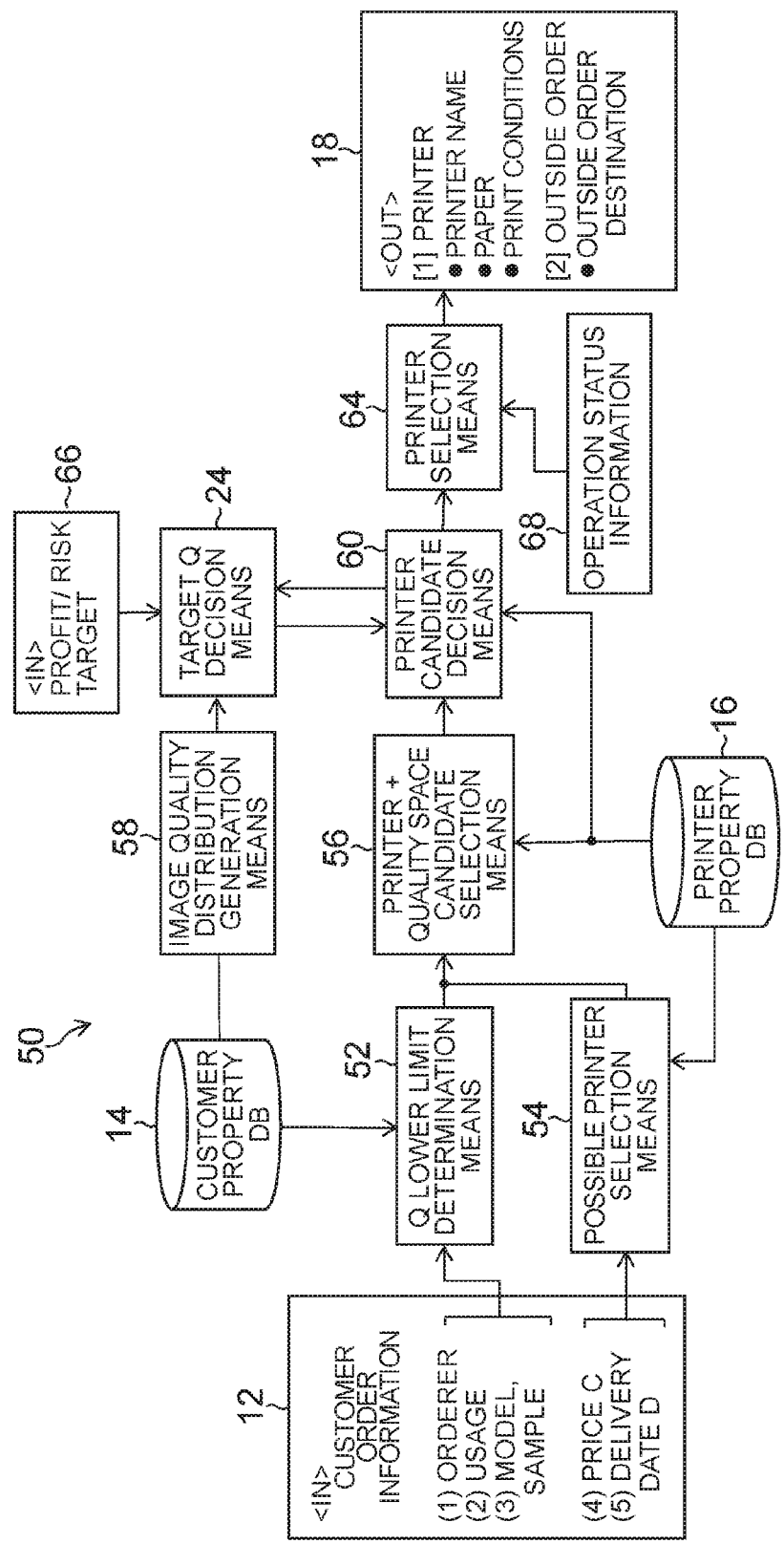
FIG. 12 is a block diagram illustrating a configuration of a printing management device according to the second embodiment.

The second embodiment that applies the configuration described in the first embodiment is described. FIG. 12 is a block diagram illustrating the configuration of a printing management device 50 according to the second embodiment. In FIG. 12, the same reference numerals are assigned to components identical or similar to the components illustrated in FIG. 1, and the explanation thereof is omitted.

The printing management device 50 includes image quality index (Q) lower limit determination means 52, possible printer selection means 54, printer candidate selection means 56, image quality distribution generation means 58, the target Q decision means 24, printer candidate decision means 60 and printer selection means 64. These means (52, 54, 56, 58, 24, 60 and 64, and so on) can be realized by a combination of hardware and software of one or multiple computers (which may include peripheral equipment thereof). Moreover, the printing management device 50 can be realized by cloud computing.

Information on an orderer, usage, model sample (comp), price and delivery date, and so on, can be included in the customer order information 12. The customer order information 12 may be part of these.

The customer property DB 14 includes data that describes OK_Q for each usage and content type for each customer. The customer property DB 14 includes OK_Q data corresponding to at least information to identify the customer (the customer name and the customer ID, and so on), the usage and the content type (see FIG. 4).

The Q lower limit determination means 52 refers to the customer property DB 14 and, from orderer information, usage information and model sample information included in the customer order information 12, understands limitation OK_Q of the orderer (customer), Limitation OK_Q is the lower limit value of OK_Q that image quality OK is acknowledged for a print request of similar usage according to past dealing results of the orderer (customer). Information on this limitation OK_Q is transmitted to the printer candidate selection means 56.

From information on the price and delivery date included in the customer order information 12, the possible printer selection means 54 refers to the printer property DB 16 or refers to a list of printers registered in the printer property DB 16, and so on. Further, the possible printer selection means 54 selects printer candidates that can physically realize specified price C and delivery date D. This possible printer selection means 54 fulfills a function to primarily extract a printer candidate group within a realistically proper range from all printers. Information on the possible printers (candidates) selected by the possible printer selection means 54 (such as the printer type name and the identification number, and these are collectively referred to as "printer name" below) is transmitted to the printer candidate selection means 56.

The printer candidate selection means 56 retrieves the printer property DB 16 on the basis of the printer name acquired from the possible printer selection means 54 and the information on limitation OK Q acquired from the Q lower limit determination means 52. Further the printer candidate selection means 56 extracts printer names having a quality space in which price C and delivery date D according to the specification can be realized and which can satisfy orderers lower limit Q. A set of the printers (printer name group) extracted at this time is a candidate group of printers that can be selected. Information on the printer name group extracted in the printer candidate selection means 56 is transmitted to the printer candidate decision means 60.

The printer candidate decision means 60 performs processing of selecting a printer based on target Q and profit/risk target from the printer name group extracted by the printer candidate selection means 56.

The image quality distribution generation means 58 processes data accumulated in the customer property DB 14 and generates OK/NG image quality distribution data (see FIG. 5).

As illustrated in FIG. 6, the target Q decision means 24 denotes means configured to set target Q by the use of the OK/NG image quality distribution data generated based on the customer property DB 14. The target Q decision means 24 includes a function to present the OK/NG image quality distribution data to an operator and a function to provide a GUI (Graphical User Interface) that presents the distribution information and accepts a specification operation of target Q from the operator.

When target Q is decided, information on the orderer's profit/risk target is also taken into account. A configuration including setting input means (reference numeral 66) configured to set target Q including the profit/risk target is preferable.

The printer candidate decision means 60 refers to the printer property DB 16 on the basis of target Q decided by the target Q decision means 24 and selects a printer in which target Q is in the quality space as illustrated in FIG. 9. Thus, it is narrowed to a printer group that satisfies both the customer's request quality and the profit/risk balance target. Here, in a case where there is not even one printer that can be extracted, this fact is notified by the printer candidate decision means 60, and the setting of target Q is performed again.

Information on the printer group selected by the printer candidate decision means 60 is transmitted to the printer selection means 64. The printer selection means 64 acquires information (operation status information) 68 showing the operation status of individual printers related to the given printer group, and specifies (selects) an optimal use printer and printing conditions thereof taking into account the operation status. By defining narrowing conditions beforehand, for example, by defining the priority level for valued items such as costs, quality and delivery date, it is possible to specify one optimal printer.

Thus, as a final output, information on the use printer name, the type of a paper to be used and printing conditions, and so on, is output in addition to information on outside order destination (printout condition information 18) if necessary.

In the example of FIG. 12, a combination of the Q lower limit determination means 52, the possible printer selection means 54, the printer candidate selection means 56, the printer candidate decision means 60 and the printer selection means 64 corresponds to the printout condition decision means 26 (see FIG. 1).

<Third Embodiment>

Figure 13:
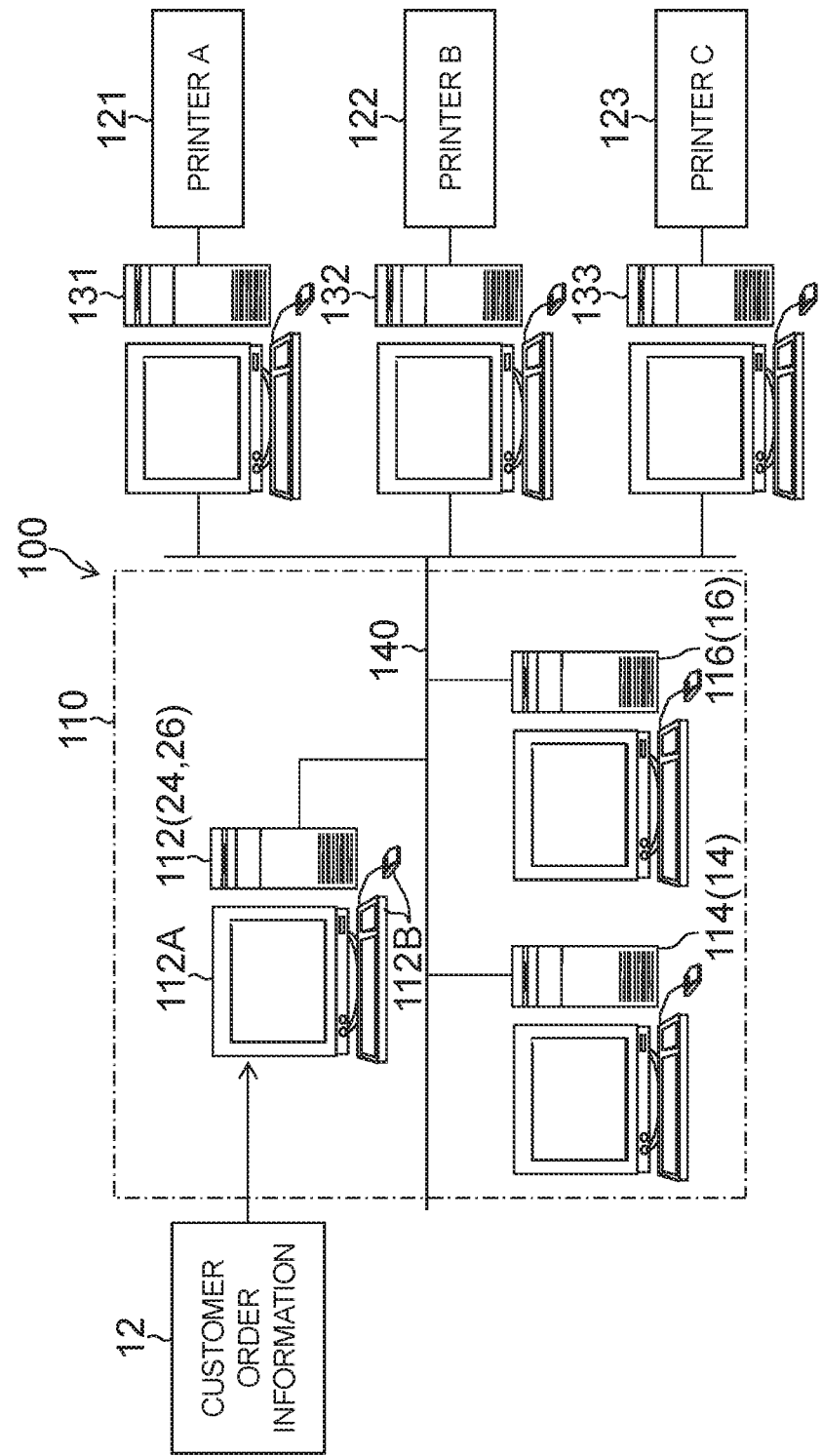
FIG. 13 is a configuration diagram of a printing system according to the third embodiment.

FIG. 13 is a configuration diagram of a printing system 100 according to the third embodiment. This printing system 100 includes multiple computers 112, 114 and 116 that function as a printing management device (printing management system) 110, multiple printers 121, 122 and 123, and computers 131, 132 and 133 that respectively function as image processing apparatuses of respective printers 121 to 123. Each of the computers 112, 114, 116, 131, 132 and 133 is connected with a network 140 such as a LAN, and can perform communication with each other.

Here, the printing management device 110 is realized by three computers 112, 114 and 116 in this example, but the number of computers is not limited to this example, and it can be realized by an arbitrary number equal to or greater than I. Moreover, the number of printers and the number of computers that function as the image processing apparatus are not especially limited either, and both numbers do not have to be assumed to be the same number. For example, one computer can manage image processing or control of multiple printers.

The first computer 112 forming the printing management device 110 functions as a JOB reception apparatus corresponding to "order reception apparatus") that imports the customer order information 12, and functions as the target Q decision means 24 and the printout condition decision means 26 illustrated in FIG. 1.

An operator can perform confirmation and input operation of various kinds of information by the use of a display (display apparatus) 112A and input apparatus 112B (such as a keyboard and a mouse) of this computer 112. For example, the distribution information illustrated in FIG. 6 is displayed on the display 112A, and the operator can operate the input apparatus 112B and specify (input) target Q while seeing the distribution information. Moreover, this computer 112 functions as image data storage means storing image data to be printed according to the customer's order. In addition, in this computer 112, it is possible to mount a function as the content type determination means 32 (see FIG. 11).

The second computer (reference numeral 114 in FIG. 13) functions as the customer property DB 14. A data group of the customer property DB 14 is stored in this computer 114, and the updating of the database is performed by the computer 114. Moreover, the computer 114 functions as the image quality distribution generation means 58 (see FIG. 12).

The third computer 116 functions as the printer property DB 16. A data group of the printer property DB 16 is stored in this computer 116, and the updating of the database is performed by the computer 116. Here, it is also possible to make the first computer 112 function as the database management apparatus of each database (14, 16).

A network 14 may be a LAN, a WAN or a combination of these. Moreover, whether it is wired or it is wireless does not matter, and it may be a combination of these.

When an output destination printer and output conditions thereof are decided by a printout condition decision function of the computer 112, image data is transmitted from the computer 112 to a computer (for example, reference numeral 132) that manages image processing and control of the corresponding printer any one of 121 to 123, for example, reference numeral 122).

The computer (for example, reference numeral 132) having received the image data performs signal processing (image processing) required for output by the printer on the received image data and generates data for print control. The content of the signal processing (image processing) includes various kinds of processing depending on the printer. For example, gradation conversion, color conversion, GCR processing, density correction processing and halftone processing, and so on, can be enumerated, and conversion into image data required for the output by the printer is performed. Based, on the data generated in this way, the operation of the printer is controlled, and a target printed matter is acquired.

<Fourth Embodiment>

Figure 14:
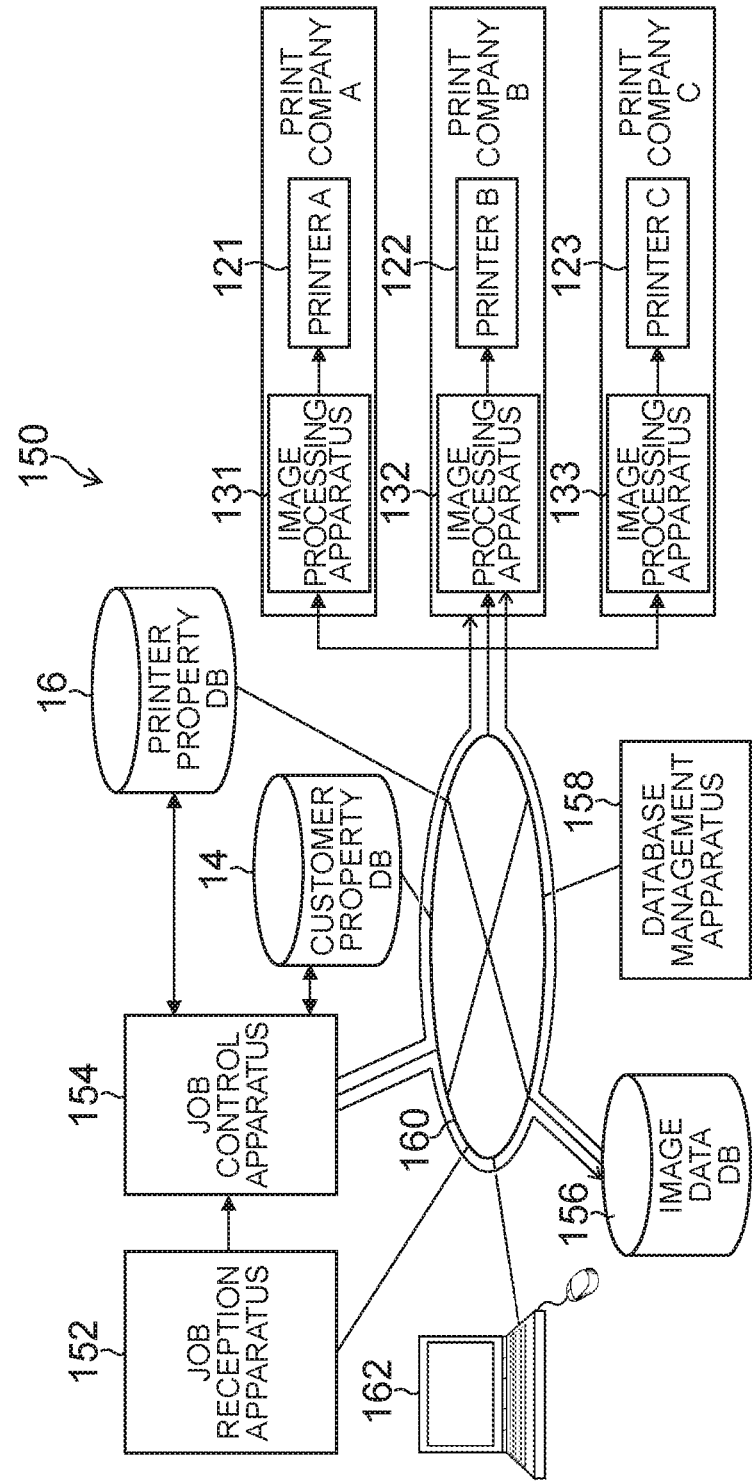
FIG. 14 is a configuration diagram of a printing service provision system according to the fourth embodiment.

FIG. 14 is a configuration diagram of a printing system according to the fourth embodiment. In FIG. 14, the same reference numerals are assigned to components identical or similar to those in the example illustrated in FIG. 13.

A printing system 150 illustrated in FIG. 14 denotes a system which: is used as a printing service provision system using a wide area communication network such as the Internet; comprehensively manages the printers 121 to 123 held by respective print companies in cooperation with multiple print companies; decides optimal printout conditions according to the customer's order; and produces a printed matter related to the order by the printer of a corresponding print company. One printer per print company, that is printers 121 to 123 of print companies A to C are illustrated for convenience of illustration in FIG. 14. A configuration in which each print company includes multiple printers is possible. The number of printers and the installation place; and so on, are not specifically limited.

This printing system 150 includes a job reception apparatus 152 that receives an order from a customer, a job control apparatus 154, the customer property DB 14, the printer property DB 16, an image data DB 156, a database management apparatus 158, multiple printers 121 to 123 and computers 131 to 133 that function as image processing apparatuses of respective printers 121 to 123, and these components are connected through a network 160.

In FIG. 14, reference numeral 162 designates a client terminal (for example, a personal computer and a portable terminal, and so on) used by a customer. The client terminal 162 includes a communication function that enables connection with the network 160. Here, only one client terminal 162 is illustrated in FIG. 14, but many unillustrated client terminals can be connected with the network 160.

The job reception apparatus 152 denotes an apparatus that imports order information (customer order information 12 in FIG. 1) from the customer. The job reception apparatus 152 is realized by a server computer on the network 160. The customer can have connection with the network 160 through the client terminal 162, access the job reception apparatus 152 by way of the network 160 and make a print order from the client terminal 162. Order information can be input from an order reception screen on a printing service site provided by the job reception apparatus 152.

Image data showing the image content of a printed matter according to an order is stored in the image data DB 156 (corresponding to "image data storage means") by way of the job reception apparatus 152. Job information (corresponding to the customer order information 12 in FIG. 1) input in the job reception apparatus 152 is transmitted from the job reception apparatus 152 to the job control apparatus 154.

The job control apparatus 154 denotes an apparatus that functions as the target Q decision means 24 and the printout condition decision means 26 illustrated in FIG. 1. Moreover, this job control apparatus 154 functions as the content type determination means 32, the image quality distribution generation means 58 and the setting means 66 illustrated in FIG. 11 or 12. The job control apparatus 154 is realized by a server computer on the network 160.

Figure 15:
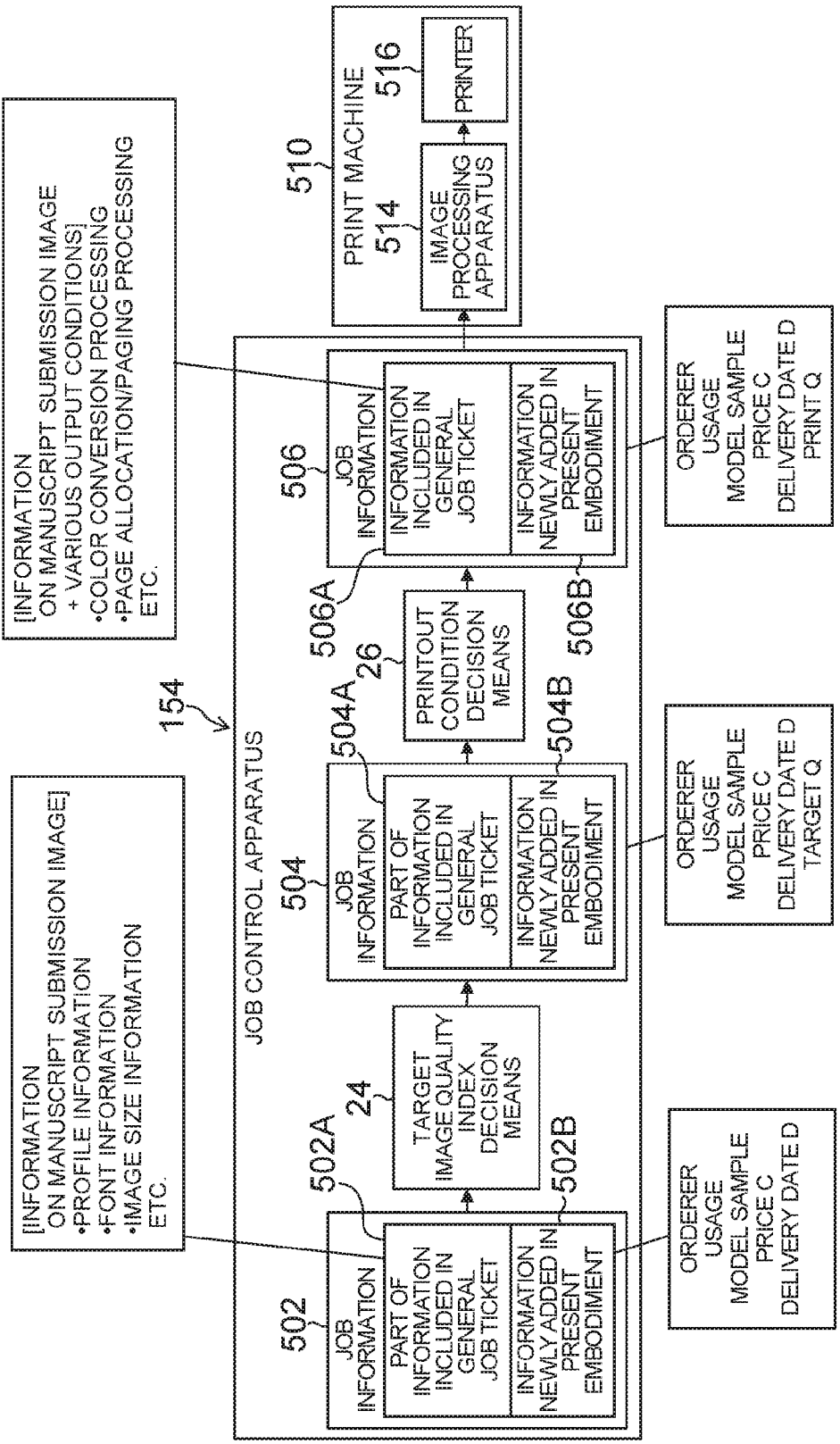
FIG. 15 is a block diagram illustrating a processing function of a job control apparatus.

FIG. 15 is a block diagram illustrating a processing function of the job control apparatus 154. The job control apparatus 154 has a function to create and edit a print job (job ticket) holding information required in a printing process of a printed matter. The job control apparatus 154 sequentially creates/edits job information 502, 504 and 506 on the basis of information acquired from the job reception apparatus 152 (see FIG. 14), and provides the finally generated job information 506 to an image processing apparatus 514 of a print machine system 510 that is printout destination. The image processing apparatus 514 and a printer 516 correspond to the image processing apparatus and the printer shown by each combination of reference numerals 131 and 121, reference numerals 132 and 122 and reference numerals 133 and 123 in FIG. 14.

The first job information illustrated by reference numeral 502 in FIG. 15 includes 502A that is part of information (hereafter referred to as "general job ticket information") included in a general job ticket, and information 502B newly added in the present embodiment. As the content of the job ticket, parameters for image processing such as color conversion and image formation processing and parameters used for processing such as page allocation and pagination, and so on, are described. In the present embodiment, information on such a general job ticket (such as a parameter for image processing) is held while information (information on output conditions shown by "print Q") retrieved in the customer property DB and the printer property DB is added. Further, this job information 506 is transferred to the print machine system 510, and printing is performed in the printer 516.

For example, partial information of general job ticket information illustrated with reference numeral 502A includes information on a manuscript submission image. As a concrete example of information related to the manuscript submission image, there are profile information required for color conversion processing, font information and image size information, and so on. Additional information illustrated with reference numeral 502B includes the content of the customer order information 12 illustrated in FIG. 1 and so on, that is, information on an orderer, usage, model sample, price C and delivery date D, and so on.

The job control apparatus 154 decides the target image quality index (target Q) by the target image quality index decision means 24 on the basis of this first job information 502 and generates second job information 504 including information on decided target Q. The second job information 504 generated in this way includes 504A that is part of general job ticket information and information 504B newly added in the present embodiment. The information illustrated by reference numeral 504A denotes an information group equivalent to the information illustrated by reference numeral 502A. The information illustrated by reference numeral 504B is acquired by adding information on target Q to the information group with reference numeral 502B.

Next, the output conditions of printing are decided by the printout condition decision means 26 on the basis of the second job information 504, and third job information 506 including information on the output conditions (written as "printing Q" on behalf of information on the output conditions) is generated, The third job information 506 includes general job ticket information 506A and information 506B newly added in the present embodiment. The general job ticket information 506A includes information on various output conditions besides the information (for example, information on manuscript submission images) illustrated with reference numeral 502A (504A). As a concrete example, information on conditions of color conversion processing (parameters associated with color processing such as color correction parameters d conditions of page allocation or paging processing, and so on, is included.

In the information illustrated by reference numeral 506B, information on the output conditions decided in the printout condition decision means 26 ("printing Q" in the figure) is described instead of information on target Q illustrated with reference numeral 504B.

As for the third job information 506 transmitted from the job control apparatus 154 to the print machine system 510, information on output conditions retrieved from the customer property DB and the printer property DB is added in addition to information included in a general job ticket like parameters for image processing such as color conversion and image formation processing and parameters used for processing such as page allocation and pagination, and so on.

Further, this third job information 506 is transferred to the print machine system 510, and printing is performed by the printer 516. Work flow software is incorporated in the image processing apparatus 514 connected with the printer 516, and the third job information 506 input in the image processing apparatus 514 is imported in an image processing unit of the work flow software. The image processing apparatus 514 performs image processing including color conversion and color correction, and so on, by the use of parameters described in the third job information 506. Moreover, the image processing apparatus 514 performs processing such as page allocation and pagination according to the necessity, and performs generation and setting of various signals required for printing by the printer 516. Thus, data generated in the image processing apparatus 514 is transmitted to the printer 516, printing is performed by the printer 516, and a printed matter is generated.

The database management apparatus 158 denotes an apparatus that comprehensively manages the customer property DB 14, the printer property DB 16 and the image data DB 156. Updating processing of each database is performed by the database management apparatus 158. For example, in a case where new history data is added to the customer property DB 14 according to dealings with a customer, the database management apparatus 158 is accessed using other computers (for example, reference numerals 131 to 133, and so on) connected with the network 160 or a computer of the database management apparatus 158 is directly operated to perform various inputs from a predetermined GUI. Updating of the database is performed by this input operation.

Moreover, the database management apparatus 158 may include a data processing function to perform arithmetic processing (such as statistical processing) using a data group in the database. For example, the function of the image quality distribution generation means 58 can be mounted to the database management apparatus 158.

A printing management system is configured by a combination of the job reception apparatus 152, the job control apparatus 154, the customer property DB 14, the printer property DB 16, the image data DB 156 and the database management apparatus 158 on the network 160. Each element (152, 154, 14, 16, 156, 158, and so on) forming this printing management system is installed on the network 160 by a service provider or print company that provides this printing service, and so on. Here, the system configuration mode is not limited to the example of FIG. 14. All or parts of the printing management system of this example can be realized by cloud computing. Moreover, all of multiple printers managed as output destination candidates do not have to be necessarily connected with the network 160.

According to the present embodiment, when output conditions of a printed matter are decided by the job control apparatus 154, the information is transmitted from the job control apparatus 154 to the image processing apparatus (for example, reference numeral 132) of the corresponding printer. Moreover, image data is provided from the image data DB 156 to the corresponding image processing apparatus. Thus, a printed matter is produced according to the output conditions decided in the job control apparatus 154, and the printed matter is provided to a customer. Information on customers evaluation (OK/NG) with respect to this provided printed matter and information on the usage, content type, output conditions and image quality index of t e printed matter, and so on, are accumulated in the customer property DB 14 as history data.

<Fifth Embodiment>

Figure 16:
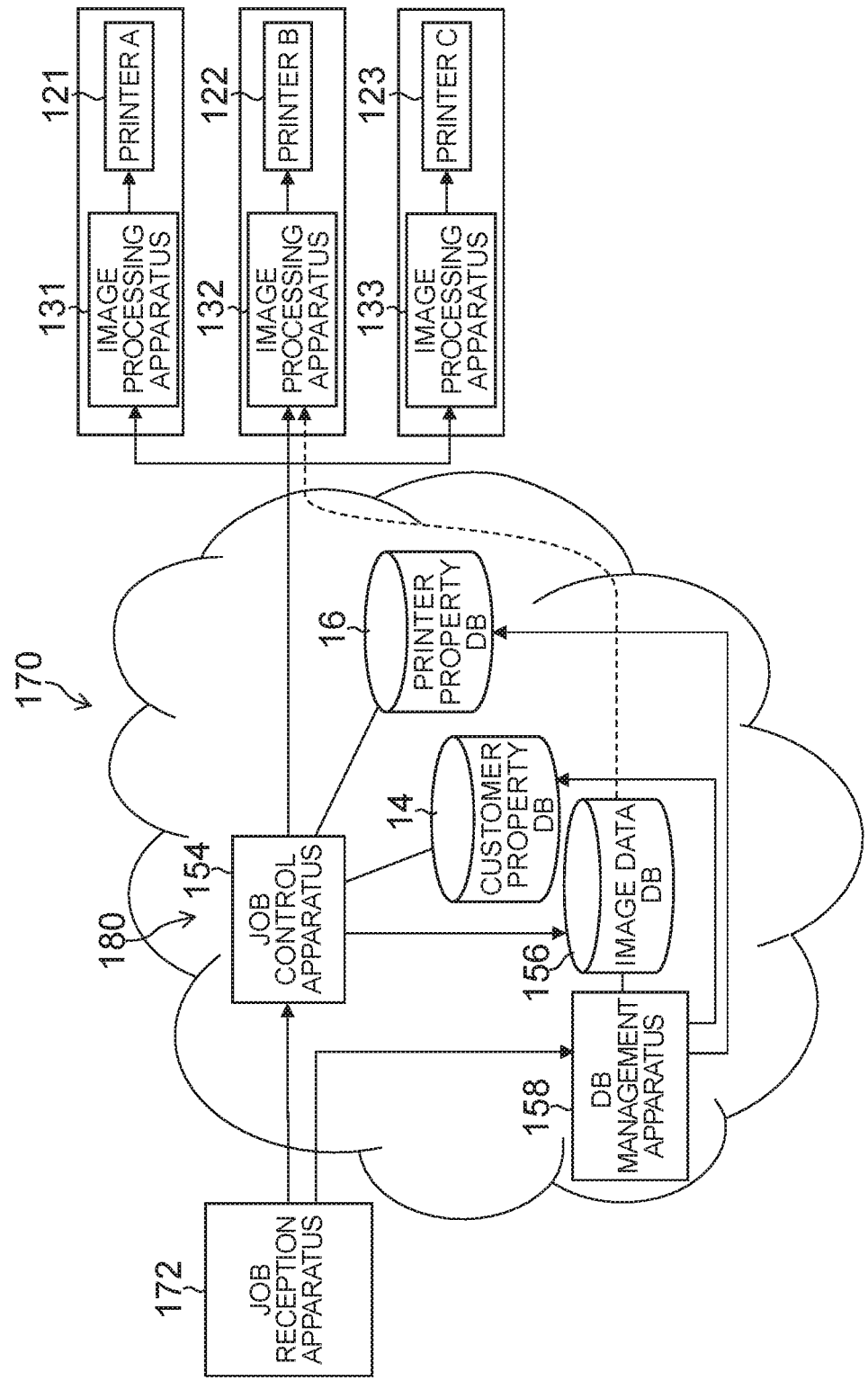
FIG. 16 is a configuration diagram of a printing system according to the fifth embodiment.

FIG. 16 is a configuration diagram of a printing system according to the fifth embodiment. In FIG. 16, the same reference numerals are assigned to components identical or similar to those in the configuration example illustrated in FIG. 14, and explanation thereof is omitted.

A printing system 170 in FIG. 16 realizes the function of the printing management device 10 illustrated in FIG. 1 by cloud computing, and is configured by combining a job reception apparatus 172 and a printing management system 180 by the cloud.

The job reception apparatus 172 is installed in a service providing company that provides a printing service or a print company, and so on. The main role of the job reception apparatus 172 is similar to the job reception apparatus 152 illustrated in FIG. 14 and imports order information from a customer by the job reception apparatus 172.

The job reception apparatus 172 can be connected with a wide area network such as the Internet, and can access the job control apparatus 154 and the database management apparatus 158 by way of the network.

Job information acquired via the job reception apparatus 172 is transmitted to the job control apparatus 154. Moreover, image data input from the job reception apparatus 172 is stored in the image data DB 156 by way of the database management apparatus 158.

In addition, the job reception apparatus 172 functions as an apparatus to input information accumulated as history data in the customer property DB 14 like information showing the customer's evaluation with respect to a provided printed matter.

Since the operation of the printing system 170 configured as above is similar to the example illustrated in FIG. 14, detailed operation explanation is omitted.

<Sixth Embodiment>

Figure 17:
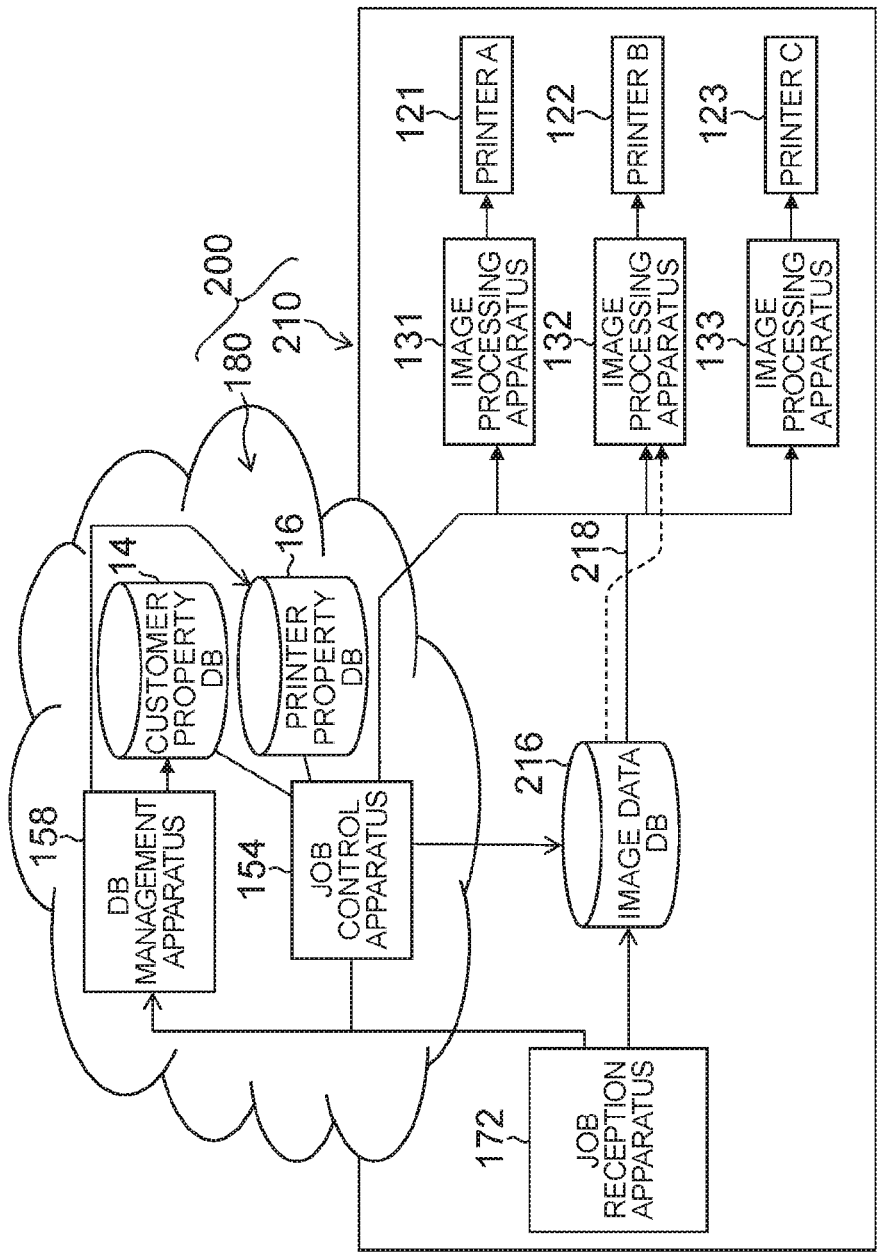
FIG. 17 is a configuration diagram of a printing system according to the sixth embodiment.

FIG. 17 is a configuration diagram of a printing system according to the sixth embodiment. In FIG. 17, the same reference numerals are assigned to components identical or similar to those in the examples illustrated in FIGS. 1 and 11 to 16.

A printing system 200 illustrated in FIG. 17 realizes the function of the printing management device 10 illustrated in FIG. 1 by cloud computing, and is configured by combining an intra-company system 210 in a print company or the like and a printing management system 180 by the cloud.

The intra-company system 210 includes the job reception apparatus 172, an image data DB 216, multiple printers 121 to 123 and image processing apparatuses (computers illustrated with reference numerals 131 to 133), and these elements are connected through a network 218 such as a LAN.

The job acceptance apparatus 172 and the image data DB 216 have the functions similar to the job reception apparatus 172 and the image data DB 156 illustrated in FIG. 14 respectively. The order of printing is received from a designer and a producer, and so on, and the order information is input in the job reception apparatus 172.

The job reception apparatus 172 can be connected with a wide area network such as the Internet, and can access the job control apparatus 154 and the database management apparatus 158 by way of the network.

The function of the printing management system 180 realized on the cloud is as illustrated in FIGS. 1 and 11 to 14, and so on. The printout condition information (job control information) decided in the job control apparatus 154 is transmitted to a corresponding image processing apparatus (for example, reference numeral 132) of the intra-company system 210. Moreover, image data is provided from the image data DB 216 to the corresponding image processing apparatus.

<Seventh Embodiment>

Figure 18:
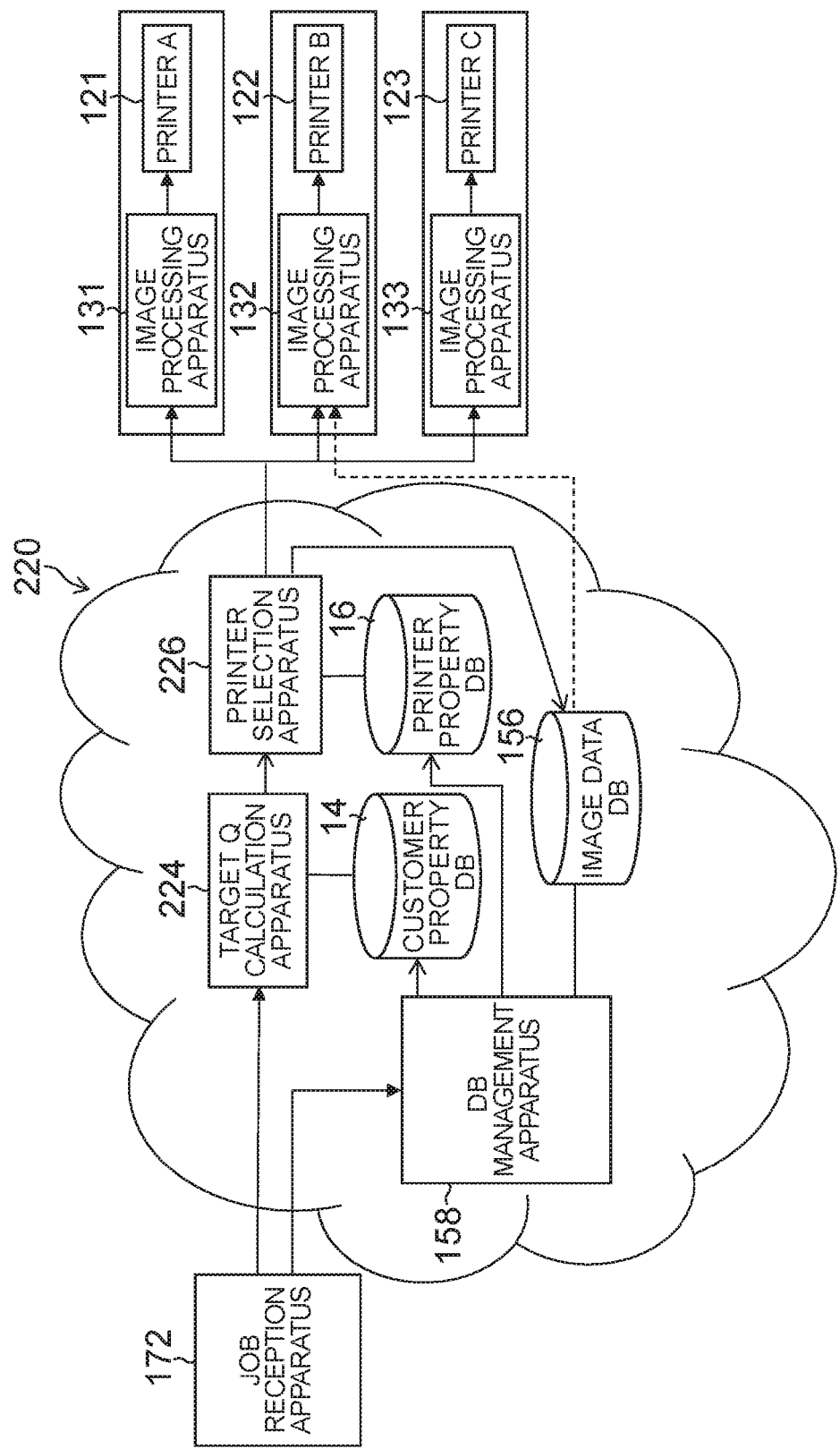
FIG. 18 is a configuration diagram of a printing system according to the seventh embodiment.

FIG. 18 is a configuration diagram of a printing system according to the seventh embodiment, in FIG. 18, the same reference numerals are assigned to components identical or similar to those in the examples illustrated in FIGS. 1 and 11 to 17.

A printing management system 220 illustrated in FIG. 18 is configured by dividing the part of the job control apparatus 154 of the printing management system 180 illustrated in FIG. 17 into a target Q calculation apparatus 224 and a printer selection apparatus 226. The target Q calculation apparatus 224 and the printer selection apparatus 226 are configured with computers that function as the target Q decision means 24 and the printout condition decision means 26 illustrated in FIG. 1 respectively. Job information acquired from the job reception apparatus 172 is transmitted to the target Q calculation apparatus 224. The target Q calculation apparatus 224 decides target Q of a printed matter according to an order with reference to the customer property DB 14. The printer selection apparatus 226 decides a printer that can realize target Q and output conditions thereof from decided target Q and order information with reference to the printer properly DB 16.

Printout condition information (job control information) decided by the printer selection apparatus 226 is transmitted to an image processing apparatus (for example, reference numeral 132) of the corresponding print company. Moreover, image data is provided from the image data DB 156 to the corresponding image processing apparatus.

<Eighth Embodiment>

Figure 19:
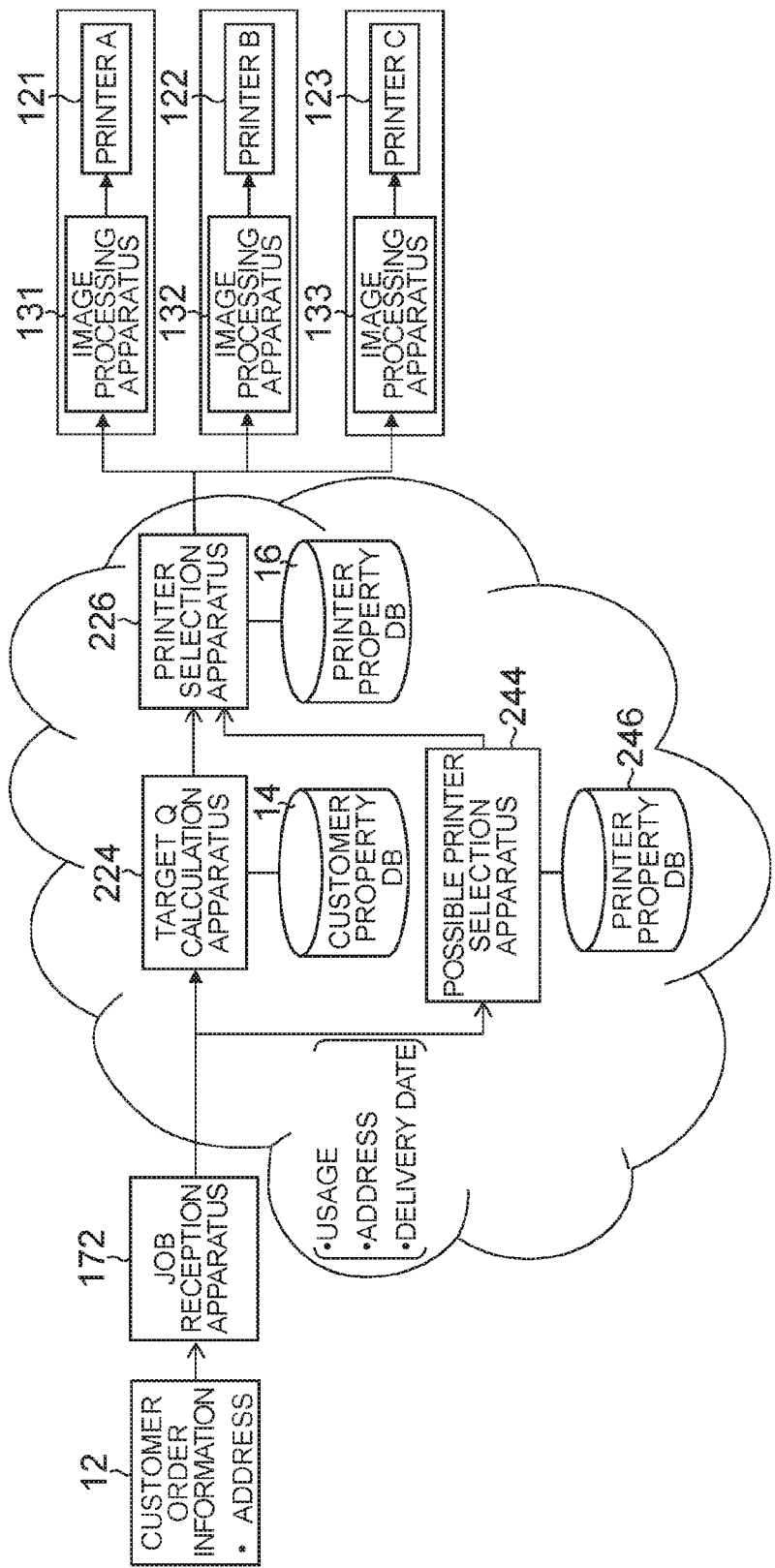
FIG. 19 is a configuration diagram of a printing system according to the eighth embodiment.

FIG. 19 is a configuration diagram of a printing system according to the eighth embodiment. In FIG. 19, the same reference numerals are assigned to components identical or similar to those in the examples illustrated in FIGS. 1 and 11 to 18. Here, in FIG. 19, description of a database management apparatus and an image data DB is omitted for the convenience of illustration.

A printing management system 240 illustrated in FIG. 19 includes a possible printer selection apparatus 244 that narrows an available printer group as the first stage by the use of information related to customer's address (location) included in the customer order information 12 and information on the usage and the delivery date, and a printer property DB 246 to which the possible printer selection apparatus 244 refers.

The possible printer selection apparatus 244 is an apparatus corresponding to the possible printer selection means 54 illustrated in FIG. 12. The printer property DB 246 describes information such as the print company name, the location of the print company, the printer name held by the print company, available media, the usage and the printing scheme, and so on.

The printer property DB 246 may be the same database as the printer property DB 16 to which the printer selection apparatus 226 refers, or may be different. The printer property DB 246 can be assumed to be a database generated by extracting part of the data group included in the printer property DB 16. In the printer property DB 246 to which the possible printer selection apparatus 244 refers, information required to perform primly extraction (extraction of a printer group on the first stage) by the possible printer selection apparatus 244 from the viewpoint of the location and the delivery date chiefly is stored.

The possible printer selection apparatus 244 selects a print company closer to the customer's address, that is, selects a possible printer group from the viewpoint as to whether the specified delivery date is met, by the use of location information on print companies and information on the printer productivity (printing scheme, and so on), and so on, which are described in the printer property DB 246.

The printer selection apparatus 226 narrows printers that can realize target Q (secondary extraction) from the printer group primarily extracted in the possible printer selection apparatus 244 and decides a printer to he finally used and output conditions.

<Ninth Embodiment>

There may be various embodiments at the time of realization of a system using the networks illustrated in FIGS. 15 to 19. Regarding the number of computers that assume each friction of the job reception apparatus 152, the job control apparatus 154, the customer property DB 14 and the printer property DB 16, and so on, the mode of network connection and the computer installation place, and so on, various designs are possible.

As an application example of the embodiments illustrated in FIGS. 16 to 19, for example, the following modes are assumed.

APPLICATION EXAMPLE 1

The printer property DB unique to each company is held on the print company side. A service provision company that receives a customer order is a company different from a print company. It is possible to assume a configuration in which this service provision company has a customer property DB.

Figure 20:
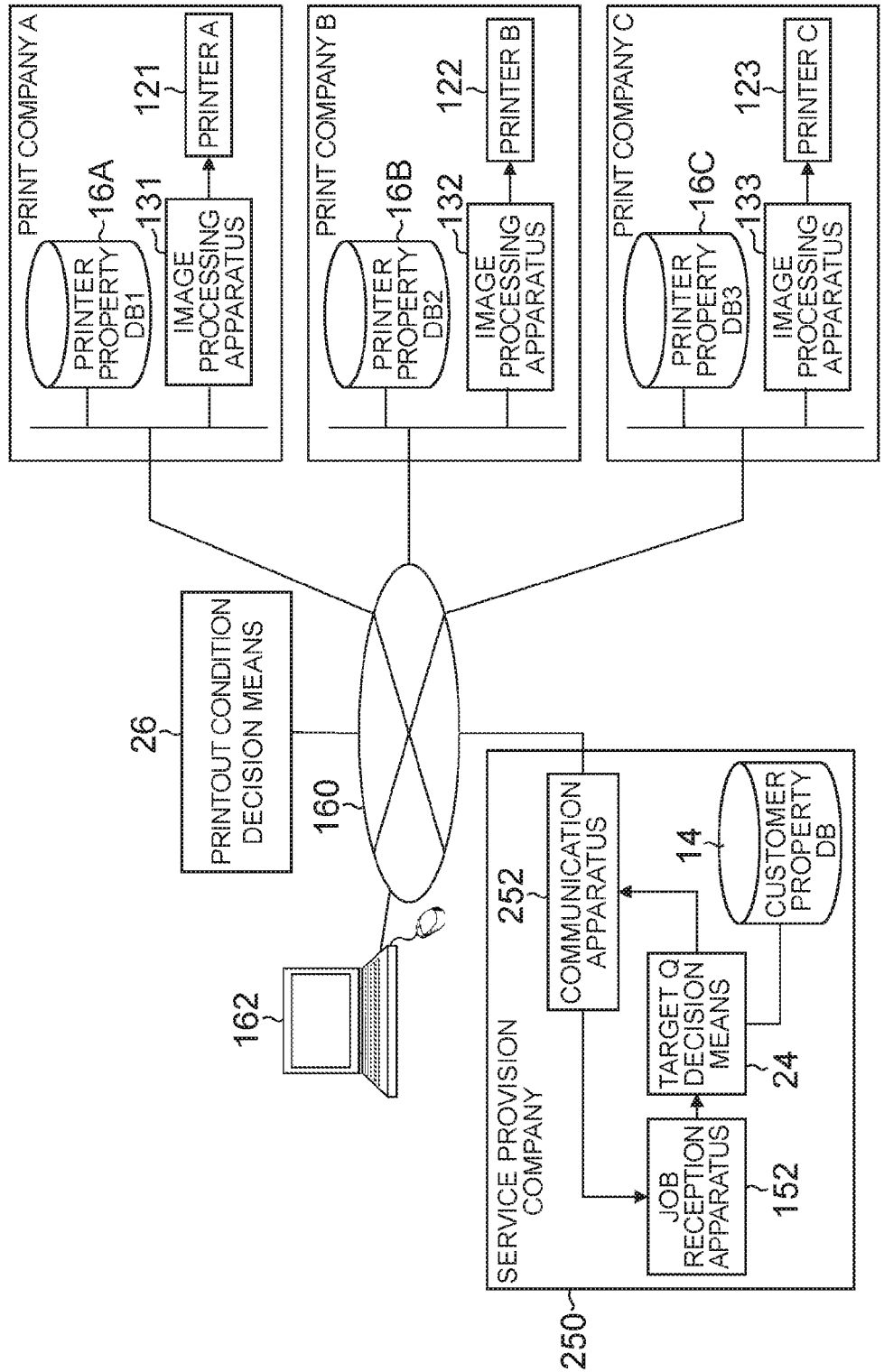
FIG. 20 is a diagram illustrating a system configuration example of the ninth embodiment.

FIG. 20 illustrates a configuration example of the ninth embodiment (application example 1). In the configuration illustrated in FIG. 20, the same reference numerals are assigned to components identical or similar to the components illustrated in FIGS. 1 to 19, and explanation thereof is omitted.

In FIG. 20, print companies A to C include printer property DB's 16A, 16B and 16C respectively. The printer property DB's 16A, 16B and 16C are connected with LAN's in print companies respectively. The printer property DB's 16A, 16B and 16C of these companies are connected with the network 160. As a whole, the aggregation of the printer property DB's 16A, 16B and 16C of respective companies corresponds to the printer property DB 16 (see FIGS. 1, 12 and 14, and so on).

An information processing device 250 that receives an order by way of the network 160 is installed in a service provision company. This information processing device 250 includes a communication apparatus 252 (corresponding to "communication means") that transmits and receives information thorough the network 160, a job reception apparatus 152, the target Q decision means 24 and the customer property DB 14. The information processing device 250 can be configured with one or multiple computers.

Target Q is decided on the basis of customer order information associated with an order received through the communication apparatus 252. Information on decided target Q is transmitted to the printout condition decision means 26 in the network 160 through the communication apparatus 252. Based on the information on target Q received in the network 160, the printout condition decision means 26 decides printout conditions with reference to the printer property DB's 16A, 16B and 16C. Information on the selected output conditions is transmitted to the image processing apparatus (131, 132 or 133) corresponding to the printer (121, 122 or 123) that becomes printout destination. Here, by providing information on the output conditions selected by the printout condition decision means 26 to the information processing device 250, the information on the output conditions can be confirmed through a display (not illustrated) of the information processing device 250. Moreover, a configuration is possible in which the information on the output conditions is provided to the corresponding image processing apparatus (131, 132 or 133) after the selected output conditions are confirmed in the information processing device 250. In this case, the information on the output conditions may be transmitted from the information processing device 250.

<Tenth Embodiment>

APPLICATION EXAMPLE 2

A configuration is possible in which: both a customer property DB and a printer property DB are provided outside the country; a printing management device installed within the country is assumed to be a search apparatus having only a function of searching each database information of the customer property DB and printer property DB in a foreign country through the Internet; and information on printout conditions is acquired as a search result.

Figure 21:
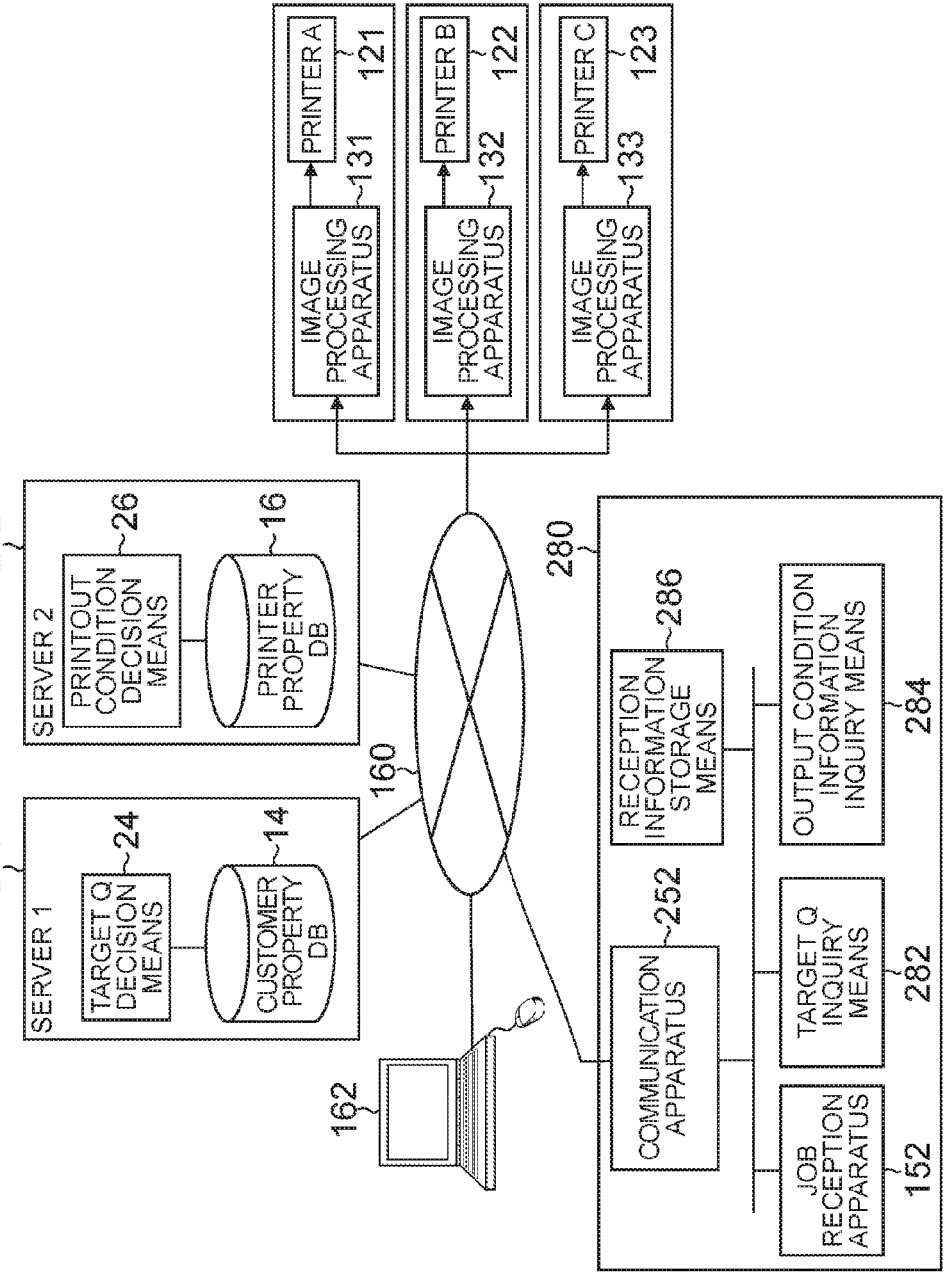
FIG. 21 is a diagram illustrating a system configuration example of the tenth embodiment.

FIG. 21 illustrates a configuration example of the tenth embodiment (application example 2). In the configuration illustrated in FIG. 21, the same reference numerals are assigned to components identical or similar to the components illustrated in FIGS. 1 to 20, and explanation thereof is omitted.

In the example of FIG. 21, a first server 271 including the customer property DB 14 and the target Q decision means 24, and a second server 272 including the printer property DB 16 and the printout condition decision means 26, are connected on the network 160. Each of the first server 271 and the second server 272 can be configured with one or multiple computers. Moreover, the first server 271 and the second server 272 can be configured with a common server (integrally configured). Part or all of one or multiple computers forming the first server 271 and the second server 272 can be installed outside the country (overseas).

Meanwhile, an information processing device 280 that functions as a search apparatus includes the communication apparatus 252, the job reception apparatus 152, target Q inquiry means 282 (corresponding to "target image quality index inquiry means"), output condition information inquiry means 284 (corresponding to "output condition inquiry means") and reception information storage means 286. The information processing device 280 is configured with one or multiple computers.

The information processing device 280 can receive an order by way of the network 160. The target Q inquiry means 282 transmits customers information, the usage of printed matters and classification information on the content type, and so on, to the first server 271 by way of the network 160 on the basis of customer order information related to the received order, and makes an inquiry (search) of target Q appropriate for the customer's order.

The target Q decision means 24 in the first server 271 decides appropriate target Q in response to the inquiry from the information processing device 280 with reference to the customer property DB 14. Information on decided target Q is provided to the information processing device 280 by way of the network 160. The information processing device 280 can receive the information on target Q from the target Q decision means 24 through the communication apparatus 252 by way of the network 160, and the received information on target Q is stored in the reception information storage means 286.

The output condition information inquiry means 284 transmits the received information on target Q from the communication apparatus 252 to the second server 272 on the network 160 and makes an inquiry (search) of printout conditions. The printout condition decision means 26 in the second server 272 selects appropriate output conditions in response to the inquiry from the information processing device 280 with reference to the printer property DB 16.

Information on the output conditions selected in this way is provided to the information processing device 280 by way of the network 160. The information processing device 280 can receive the information on the output conditions from the printout condition decision means 26 through the communication apparatus 252 by way of the network 160, and the received information on the output conditions is stored in the reception information storage means 286.

The information processing device 28C) can transmit the received information on the output conditions to an image processing apparatus (131, 132 or 133) corresponding to a printer (121, 122 or 123) that becomes printout destination through the communication apparatus 252.

<Example of GUI>

Next, an example of GUI is described.

[Screen Example when Order is Received]

Figure 22:
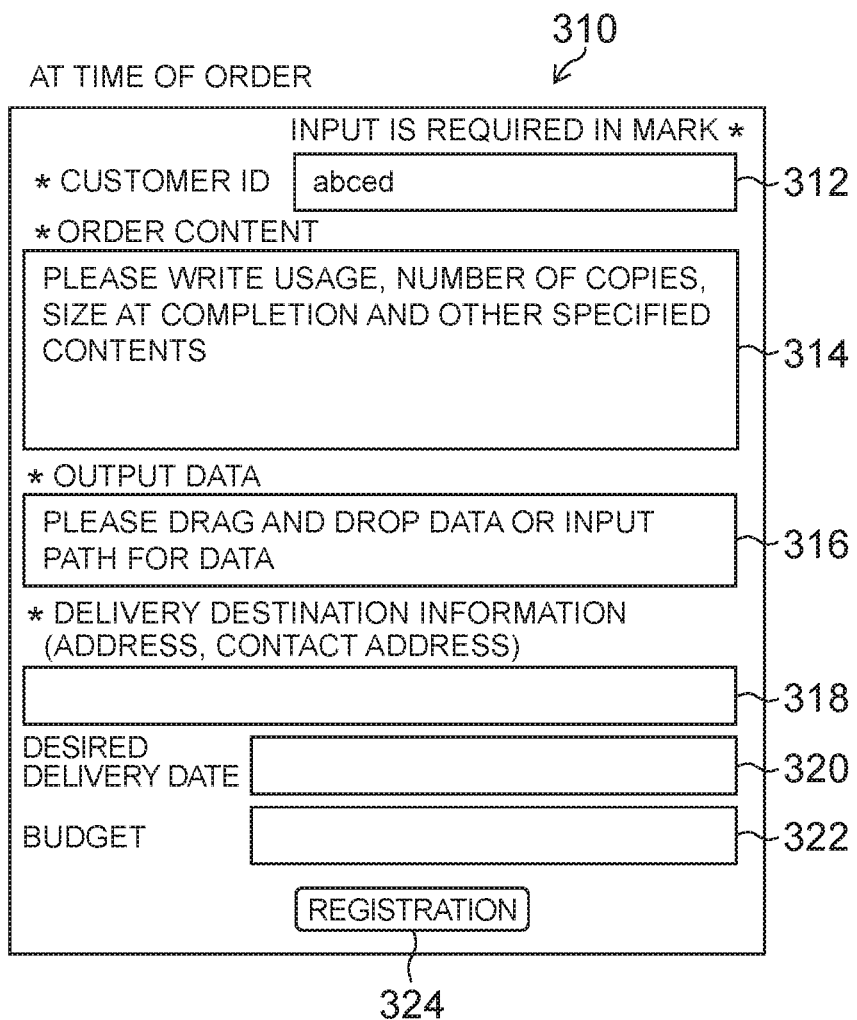
FIG. 22 is a diagram illustrating a GUI (Graphical User Interface) screen example for job acceptance.

FIG. 22 is an example of a GUI screen for job reception. An order reception screen 310 presented at the time of an order is displayed on a display of the job reception apparatus or a display of the client terminal 162 in FIG. 14, and so on. An operator of a printing service provision company or print company, or a customer himself/herself performs various inputs on this the order reception screen 310.

An entry column 312 of the customer ID (identification sign), an entry column 314 of order content, a box 316 to specify output data (image data), an entry column 318 of delivery destination information, an entry column 320 of desired delivery date, an entry column 322 of a budget and a registration button 324 are displayed on the order reception screen 310.

When an operator or customer writes a necessary matter in each column and presses clicks) the registration button 324, the input information is registered in the job reception apparatus. When order information is input and a job related to the order is registered, the identification number (job ID) to identify the job is automatically attached. Here, at the time of input of information in the order reception screen 310, in cooperation with a database that manages customer information, and so on, it is preferable to provide a configuration including an input support function that automatically inputs information on the customer address such as delivery destination) by the input of the customer ID. Moreover, in this example, a configuration in which characters are freely input in the entry column 314 for the order content is adopted, and the content of this entry column 314 is analyzed by software of the job reception apparatus to arrange and acquire information on the usage and the number of copies, and so on. Instead of such a scheme, a form to specify the input matter of each item may be provided.

[Screen Example when Output Conditions are Selected]

FIG. 23 is an example of a GUI screen displayed when target Q is set. This output condition selection screen 340 is displayed on a display of a computer that functions as the target Q decision means 24 (see FIG. 1) or a display of a terminal apparatus (not illustrated) that accesses the job control apparatus 154 (printer selection apparatus 226) through a network, and so on.

An entry column 341 that specifies the job ID, a display column 342 of the customer ID, an order content display column 344, a display column 346 of a matter specified by an order, a target Q selection operation unit 350, a selection button 358, an available printer list display unit 360, an entry column 362 of the printer number and a decision button 364 are displayed on the output condition selection screen 340.

When the job ID is input in the entry column 341, display of the customer ID registered in association with this job ID, order content and matters specified by the order, and so on, are automatically read out, and corresponding content is displayed on respective display columns (342, 344 and 346).

The target Q selection operation unit 350 of includes a distribution information display unit 352 in which image quality distribution information of OK/NG calculated from history data related to the identical usage of the customer is displayed, and a slider bar 356 displayed near the axis of image quality index Q (vertical axis in the figure) in the image quality distribution information. The image quality index distribution data illustrated in FIGS. 5 and 6 is displayed in the distribution information display unit 352.

In the case of a new customer, distribution data of an average value calculated from data of multiple customers is presented to the distribution information display unit 352 as standard data.

The switch of the slider bar 356 can be moved in parallel to the axis of image quality index Q of this image quality distribution information, and it is possible to specify the value of large Q according to the position of the slider bar 356. An operator can operate the slider bar 356 with reference to image quality distribution information and specify target Q.

When target Q is specified in the slider bar 356 and the selection button 358 is pressed, the printer property DB 16 is referred to, and corresponding printer names (IDs) and their operation schedules and operation statuses are displayed on the available printer list display unit 360. Here, information on the operation schedules and the operation statuses may be acquired from the printer property DB 16 or may be acquired from computers (131 to 133) of print companies, and so on.

In a case where even one available printer is not found, alarm display of that content is performed in the column. In this case, the operator performs setting operation of target Q again.

Moreover, the number of available printers may be displayed according to the slide movement of the slider bar 356. Moreover, information on the operation schedule and the operation status may be displayed in the form of Gantt chart. Moreover, an optimal printer may be automatically recommended and displayed in cooperation with scheduling software.

Based on the information displayed on the available printer list display unit 360, the number used as an output printer is input in the entry column 362 of the printer number, and, when the decision button 364 is pressed, the corresponding printer is decided as output destination. Here, the entry column 362 of the printer number ma be cooperated with the display of the available printer list display unit 360, and a configuration is possible in which the number of the output printer is displayed on the entry column 362 by operation to click the column of the corresponding printer from the available printer list display unit 360, and so on.

[Screen Example when Image Quality Index Evaluation of Printed Matter is Registered]

Figure 24:
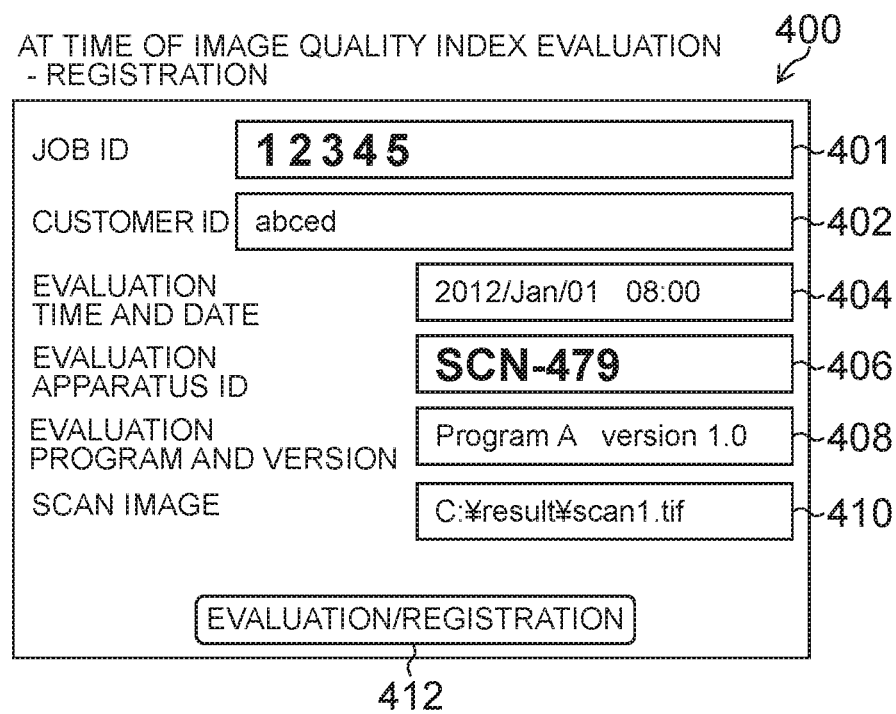
FIG. 24 is a diagram illustrating a GUI screen example used when an image quality index evaluation of an output image is registered.

FIG. 24 is an example of a GUI screen displayed when the image quality index evaluation of a printed matter (output image) provided to a customer is registered in the customer property DB 14. Moreover, it is also a screen when a print result is registered in the printer property DB. This registration screen 400 is used when the output image (printed matter) is read by a scanner or the like and is transferred to processing of an image analysis program for image quality evaluation.

The registration screen 400 is used when a person (print company, and so on) who can acquire an output printed matter inputs information in the customer property DB 14 and the printer property DB 16 by the use of the job reception apparatus 172 and the database management apparatus 158 of the print company, and so on, or a terminal apparatus (not illustrated) that accesses the database management apparatus 158 by way of a network.

An entry column 401 of the job ID, a customer ID entry column 402, an entry column 404 of evaluation time and date, an entry column 406 in which the identification number (ID) of an evaluation apparatus (such as a scanner and a camera) is written, an entry column 408 of information to specify an image quality evaluation program, an entry column 410 in which the file storage place of scan image data scanning a printed matter is written, and an evaluation/registration button 412 are displayed on the registration screen 400.

When necessary matters are described in respective entry columns 401 to 410 and the evaluation/registration button 412 are pressed, a predetermined image evaluation program operates with respect to data of the scan image and the calculation of an image quality index is automatically performed. Further, data of the calculation result is recorded in respective item columns of "image quality index" of the customer property DB 14 and the printer property DB 16.

That is, information that associates print conditions at the time of the output of the printed matter and the calculated image quality index is registered in the printer property DB 16, while information on an image quality index associated with the Job ID, the usage, the content type, the customer name, and so on, is registered in the customer property DB 14.

At the stage at which the evaluation/registration button 412 is pressed, the above-mentioned information is merely added to the printer property DB 16 and the customer property DB 14, and the customer's evaluation (evaluation of OK/NG) with respect to the printed matter is not described.

Afterward, the customer's evaluation is understood through communication with the customer (delivery destination) by delivering the printed matter to the customer, and so on, and the information is input from the registration screen(see FIG. 22) of the customer evaluation result.

[Screen Example when Customer Evaluation Result is Registered]

FIG. 25 is an example of a registration screen when the customer's evaluation (reaction) with respect to a printed matter provided to the customer is registered. An entry column 421 of the job ID, an entry column 422 of the customer ID, an entry column 424 of evaluation time and date, an entry column 426 of evaluation conditions, an entry column 430 in which information on the customer's evaluation with respect to the printed matter is described, and a registration button 438 are displayed on this registration screen 420.

In the entry column 426 of evaluation conditions, lighting conditions at the time of customer evaluation, and so on, are described. In the entry column 430 in which customer's evaluation is described, there are installed an image display unit 432 on which the content of an output image is displayed, and comment description units 434 and 436 in which comments can be freely described. It may be configured such that the positions and size of the image display unit 432 and the comment description units 434 and 436 in the entry column 430 can be freely changed, and a display range may be fixed The image content displayed on the image display unit 432 can be separated by content and have a comment. The evaluation of OK/NG and the reason, and so on, can be described in the comment description units 434 and 436 with respect to a selected content region.

When necessary matters are described in respective entry columns 421 to 430 and the registration button 438 is pressed, the information is recorded in the customer property DB 14.

The GUI illustrated in FIGS. 21 to 25 is one example, and various modes are possible for the design of the GUI. The GUI screen used for various inputs exemplified here may be provided on the cloud, and may be read out by accessing a specific server. Alternatively, these information input functions may be incorporated in a computer (such as a Job reception apparatus and a database management apparatus) held by a print company, and so on. Means for providing such a GUI corresponds to "user interface presentation means".

Here, the present invention can be provided as a computer-readable program code to make a device perform the above-mentioned processing, anon-transitory computer-readable recording medium in which the program code is stored (for example, an optical disk (such as a CD (Compact Disc), a DVD (Digital Versatile Disc), and a BD (Blu-ray Disc)) and a magnetic disk (such as a hard disk and a magneto-optical disk)), and a computer program product that stores an executable code for the method.

In the embodiments of the present invention described above, it is possible to arbitrarily change, add or delete components without departing from the scope of the present invention. The present invention is not limited to the embodiments described above, and many changes are possible by persons who have common knowledge of the field within the technical idea of the present invention.

What is claimed is:

1. A printing management device configured to decide output conditions of a printed matter according to a customer's order information, comprising:
    a customer property database configured to accumulate history data where two or more data sets of classification information on at least one of usage and content type of a printed matter provided in past dealings with each customer, an image quality index showing quality of the printed matter by a numerical value, and customer's evaluation with respect to the printed matter are associated with each other;
    an image quality distribution generation processor configured to generate at least one of image quality distribution data showing distribution of image quality indices and number of times that satisfy customer's request quality in the past dealings, and image quality distribution data showing distribution of image quality indices and number of times that do not satisfy customer's request quality in the past dealings, using the history data accumulated in the customer property database; and
    a target image quality index decision processor configured to decide a target image quality index showing target quality of a printed matter according to the customer's order information using the at least one of the image quality distribution data,
    wherein the history data used for generating the image quality distribution data includes two or more data sets regarding plural past dealings.

2. A printing management device according to claim 1, further comprising a print output conditions deciding processor configured to output information of a printer that can realize the customer's order information and the target image quality index based on printer property data in which the printer and an image quality index realized by the printer are associated, the customer's order information, and the target image quality index.

3. The printing management device according to claim 1, wherein the image quality distribution generation processor generates the at least one of the image quality distribution data corresponding to the classification information, and the target image quality index decision processor decides the target image quality index showing the target quality of the printed matter according to the customer's order information using the at least one of the image quality distribution data corresponding to the classification information.

4. The printing management device according to claim 1, wherein the image quality distribution generation processor generates a histogram as the image quality distribution data showing relationship between image quality indices and number of times that satisfy customer's request quality for respective purposes of printed matters from the history data.

5. The printing management device according to claim 1, wherein the image quality distribution generation processor generates a histogram as the image quality distribution data showing relationship between image quality indices and number of times that do not satisfy customer's request quality for respective purposes of printed matters from the history data.

6. A printing management method of deciding output conditions to provide a printed matter according to a customer's order information, the method comprising:
    preparing a customer property database configured to accumulate history data where two or more data sets of classification information on at least one of usage and content type of a printed matter provided in past dealings with each customer, an image quality index showing quality of the printed matter by a numerical value, and customer's evaluation with respect to the printed matter are associated with one another,
    the method further comprising using one or more processors to perform:
    an image quality distribution generation step of generating at least one of image quality distribution data showing distribution of image quality indices and number of times that satisfy customer's request quality in the past dealings, and image quality distribution data showing distribution of image quality indices and number of times that do not satisfy customer's request quality in the past dealings, using the history data accumulated in the customer property database; and
    a target image quality index decision step of deciding a target image quality index showing target quality of a printed matter according to the customer's order information using the at least one of the image quality distribution data, and
    wherein the history data used for generating the image quality distribution data includes two or more data sets regarding plural past dealings.

7. A printing management method according to claim 6, further comprising using one or more processors to perform:
    a print output conditions deciding step of outputting information of a printer that can realize the customer's order information and the target image quality index based on printer property data in which a printer and an image quality index realized by the printer are associated, the customer's order information, and the target image quality index.

8. The printing management method according to claim 6, wherein the image quality distribution generation step generates the at least one of the image quality distribution data corresponding to the classification information, and the target image quality index decision step decides the target image quality index showing the target quality of the printed matter according to the customer's order information using the at least one of the image quality distribution data corresponding to the classification information.

9. The printing management method according to claim 6, wherein the image quality distribution generation step generates a histogram as the image quality distribution data showing relationship between image quality indices and number of times that satisfy customer's request quality for respective purposes of printed matters from the history data.

10. The printing management method according to claim 6, wherein the image quality distribution generation step generates a histogram as the image quality distribution data showing relationship between image quality indices and number of times that do not satisfy customer's request quality for respective purposes of printed matters from the history data.

11. A non-transitory computer-readable tangible medium recording a program
causing at least one computer to function as:
a customer property database configured to accumulate history data of a customer's order information where two or more data sets of classification information on at least one of usage and content type of a printed matter provided in past dealings with each customer, an image quality index showing quality of the printed matter by a numerical value, and customer's evaluation with respect to the printed matter are associated with each other;
an image quality distribution generation processor configured to generate at least one of image quality distribution data showing distribution of image quality indices and number of times that satisfy customer's request quality in the past dealings, and image quality distribution data showing distribution of image quality indices and number of times that do not satisfy customer's request quality in the past dealings, using the history data accumulated in the customer property database; and
a target image quality index decision processor configured to decide a target image quality index showing target quality of a printed matter according to the customer's order information using the at least one of the image quality distribution data,
wherein the history data used for generating the image quality distribution data includes two or more data sets regarding plural past dealings.

12. A non-transitory computer-readable tangible medium according to claim 11,
wherein the program causes the at least the one computer to function a print output
conditions deciding processor configured to output information of a printer that can realize the customer's order information and the target image quality index based on printer property data in which the printer and an image quality index realized by the printer are associated, the customer's order information, and the target image quality index.

13. A non-transitory computer-readable tangible medium according to claim 11, wherein the image quality distribution generation processor generates the at least one of the image quality distribution data corresponding to the classification information, and the target image quality index decision processor decides the target image quality index showing the target quality of the printed matter according to the customer's order information using the at least one of the image quality distribution data corresponding to the classification information.

14. A non-transitory computer-readable tangible medium according to claim 11, wherein the image quality distribution generation processor generates a histogram as the image quality distribution data showing relationship between image quality indices and number of times that satisfy customer's request quality for respective purposes of printed matters from the history data.

15. A non-transitory computer-readable tangible medium according to claim 11, wherein the image quality distribution generation processor generates a histogram as the image quality distribution data showing relationship between image quality indices and number of times that do not satisfy customer's request quality for respective purposes of printed matters from the history data.

16. A printing management device configured to decide output conditions of a printed matter according to a customer's order information, comprising:
a customer property database configured to accumulate history data where two or more data sets of classification information on at least one of usage and content type of a printed matter provided in past dealings with each customer, an image quality index showing quality of the printed matter by a numerical value and customer's evaluation with respect to the printed matter are associated with each other;
an image quality distribution generation processor configured to generate at least one of image quality distribution data showing distribution of image quality indices and number of times that satisfy customer's request quality corresponding to the classification information, and image quality distribution data showing distribution of image quality indices and number of times that do not satisfy customer's request quality corresponding to the classification information, using the history data accumulated in the customer property database; and
a target image quality index decision processor configured to decide a target image quality index showing target quality of a printed matter according to the customer's order information using the at least one of the image quality distribution data corresponding the classification information,
wherein the history data used for generating the image quality distribution data includes two or more data sets regarding plural past dealings.

17. The printing management device according to claim 16, wherein the image quality distribution generation processor generates a histogram as the image quality distribution data showing relationship between image quality indices and number of times that satisfy customer's request quality for respective purposes of printed matters from the history data.

18. The printing management device according to claim 16, wherein the image quality distribution generation processor generates a histogram as the image quality distribution data showing relationship between image quality indices and number of times that do not satisfy customer's request quality for respective purposes of printed matters from the history data.

19. A printing management method configured to decide output conditions of a printed matter according to a customer's order information, the method using one or more processors to perform:
an accumulating step of accumulating history data in a customer property database where two or more data sets of classification information on at least one of usage and content type of a printed matter provided in past dealings with each customer, an image quality index showing quality of the printed matter by a numerical value and customer's evaluation with respect to the printed matter are associated with each other;

an image quality distribution generation step of generating at least one of image quality distribution data showing distribution of image quality indices and number of times that satisfy customer's request quality corresponding to the classification information, and image quality distribution data showing distribution of image quality indices and number of times that do not satisfy customer's request quality corresponding to the classification information, using the history data accumulated in the customer property database; and a target image quality index decision step of deciding a target image quality index showing target quality of a printed matter according to the customer's order information using the at least one of the image quality distribution data corresponding the classification information, wherein the history data used for generating the image quality distribution data includes two or more data sets regarding plural past dealings.

20. The printing management method according to claim 19, wherein the image quality distribution generation step generates a histogram as the image quality distribution data showing relationship between image quality indices and number of times that satisfy customer's request quality for respective purposes of printed matters from the history data.

21. The printing management method according to claim 19, wherein the image quality distribution generation step generates a histogram as the image quality distribution data showing relationship between image quality indices and number of times that do not satisfy customer's request quality for respective purposes of printed matters from the history data.

22. A non-transitory computer-readable tangible medium recording a program causing at least one computer to function as:

a customer property database configured to accumulate history data where two or more data sets of classification information on at least one of usage and content type of a printed matter provided in past dealings with each customer, an image quality index showing quality of the printed matter by a numerical value and customer's evaluation with respect to the printed matter are associated with each other;

an image quality distribution generation processor configured to generate at least one of image quality distribution data showing distribution of image quality indices and number of times that satisfy customer's request quality corresponding to the classification information, and image quality distribution data showing distribution of image quality indices and number of times that do not satisfy customer's request quality corresponding to the classification information, using the history data accumulated in the customer property database; and a target image quality index decision processor configured to decide a target image quality index showing target quality of a printed matter according to the customer's order information using the at least one of the image quality distribution data corresponding the classification information, wherein the history data used for generating the image quality distribution data includes two or more data sets regarding plural past dealings.

23. The computer readable medium according to claim 22, wherein the image quality distribution generation processor generates a histogram as the image quality distribution data showing relationship between image quality indices and number of times that satisfy customer's request quality for respective purposes of printed matters from the history data.

24. The computer readable medium according to claim 22, wherein the image quality distribution generation processor generates a histogram as the image quality distribution data showing relationship between image quality indices and number of times that do not satisfy customer's request quality for respective purposes of printed matters from the history data.

* * * * *